US012801607B2

(12) United States Patent
Bove et al.

(10) Patent No.: US 12,801,607 B2
(45) Date of Patent: Nov. 17, 2026

(54) QUERY EXECUTION PLANNING VIA A QUERY AND RESPONSE SUB-SYSTEM OF A DATABASE SYSTEM

(71) Applicant: Ocient Holdings LLC, Chicago, IL (US)

(72) Inventors: Samuel Peter Bove, Chicago, IL (US); Jason Arnold, Chicago, IL (US); Susmita Saha, Chicago, IL (US); Sarah Kate Schieferstein, Chicago, IL (US); Max Guthmann, Chicago, IL (US); Ellis Mihalko Saupe, University City, MO (US); Greg R. Dhuse, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 19/313,436

(22) Filed: Aug. 28, 2025

(65) Prior Publication Data

US 2026/0050595 A1 Feb. 19, 2026

Related U.S. Application Data

(63) Continuation of application No. 18/800,223, filed on Aug. 12, 2024, now Pat. No. 12,423,303, which is a continuation of application No. 18/321,906, filed on May 23, 2023, now Pat. No. 12,124,449.

(60) Provisional application No. 63/365,216, filed on May 24, 2022.

(51) Int. Cl.
*G06F 16/2453* (2019.01)
*G06F 16/2455* (2019.01)

(52) U.S. Cl.
CPC .... *G06F 16/24544* (2019.01); *G06F 16/2456* (2019.01)

(58) Field of Classification Search
CPC ....................... G06F 16/24544; G06F 16/2456
See application file for complete search history.

(56) References Cited

U.S. PATENT DOCUMENTS 5,963,933 A * 10/1999 Cheng .............. G06F 16/24537 707/999.005
2013/0124500 A1* 5/2013 Beavin .............. G06F 16/24534 707/E17.017
2017/0147644 A1* 5/2017 Lee ......................... G06F 16/00
2020/0117664 A1* 4/2020 Kondiles ............... G06F 9/5027

(Continued)

*Primary Examiner* — Angelica Ruiz
(74) *Attorney, Agent, or Firm* — Garlick & Markison; Timothy W. Markison

(57) ABSTRACT

A query and response sub-system is operable to obtain a query and to generate an execution plan for a left inner join function of the query. The execution plan includes: identify left data of a column of the left table based on a reference column that is common to both tables; forward the rows of left data to memory allocated for a result table; identify right data of a column of the right table based on the reference column; temporarily store rows of the right data in memory allocated for the right table; identify rows of matching data from the rows of right data based on matching data of the reference column; add the rows of matching data to the result table; identify rows of non-matching data from the rows of right data based on data of the reference column; and add NULL to the rows of non-matching data to the result table.

13 Claims, 34 Drawing Sheets

(56) References Cited

U.S. PATENT DOCUMENTS

2021/0019318 A1* 1/2021 Leung ................ G06F 16/2393
2021/0286816 A1* 9/2021 Cruanes ........... G06F 16/24537

* cited by examiner database system 10 computing device 18 computing device 18 computing device 18 node 37 node 37 node 37 data set database system 10 query execution module 2504 query execution module 2504 query execution module 2504 query execution module 2504 query execution module 2504 query execution module 2504 query execution module 2504 query execution module 2504

QUERY EXECUTION PLANNING VIA A QUERY AND RESPONSE SUB-SYSTEM OF A DATABASE SYSTEM

CROSS-REFERENCE TO RELATED APPLICATIONS

The present U.S. Utility Patent Application claims priority pursuant to 35 U.S. C. § 120 as a continuation of U.S. Utility Application No. Ser. No. 18/800,223, entitled "QUERY PROCESSING WITH LIMIT OPTIMIZATION IN A DATABASE SYSTEM", filed Aug. 12, 2024, which claims priority pursuant to 35 U.S. C. § 120 as a continuation of U.S. Utility Application No. Ser. No. 18/321,906, entitled "PROCESSING LEFT JOIN OPERATIONS VIA A DATABASE SYSTEM BASED ON FORWARDING INPUT", filed May 23, 2023, issued as U.S. Pat. No. 12,124,449 on Oct. 22, 2024, which claims priority pursuant to 35 U.S. C. § 119(e) to U.S. Provisional Application No. 63/365,216, entitled "IMPLEMENTING JOIN EXPRESSIONS IN DATABASE SYSTEMS", filed May 24, 2022, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

DETAILED DESCRIPTION OF THE INVENTION

Figure 1:
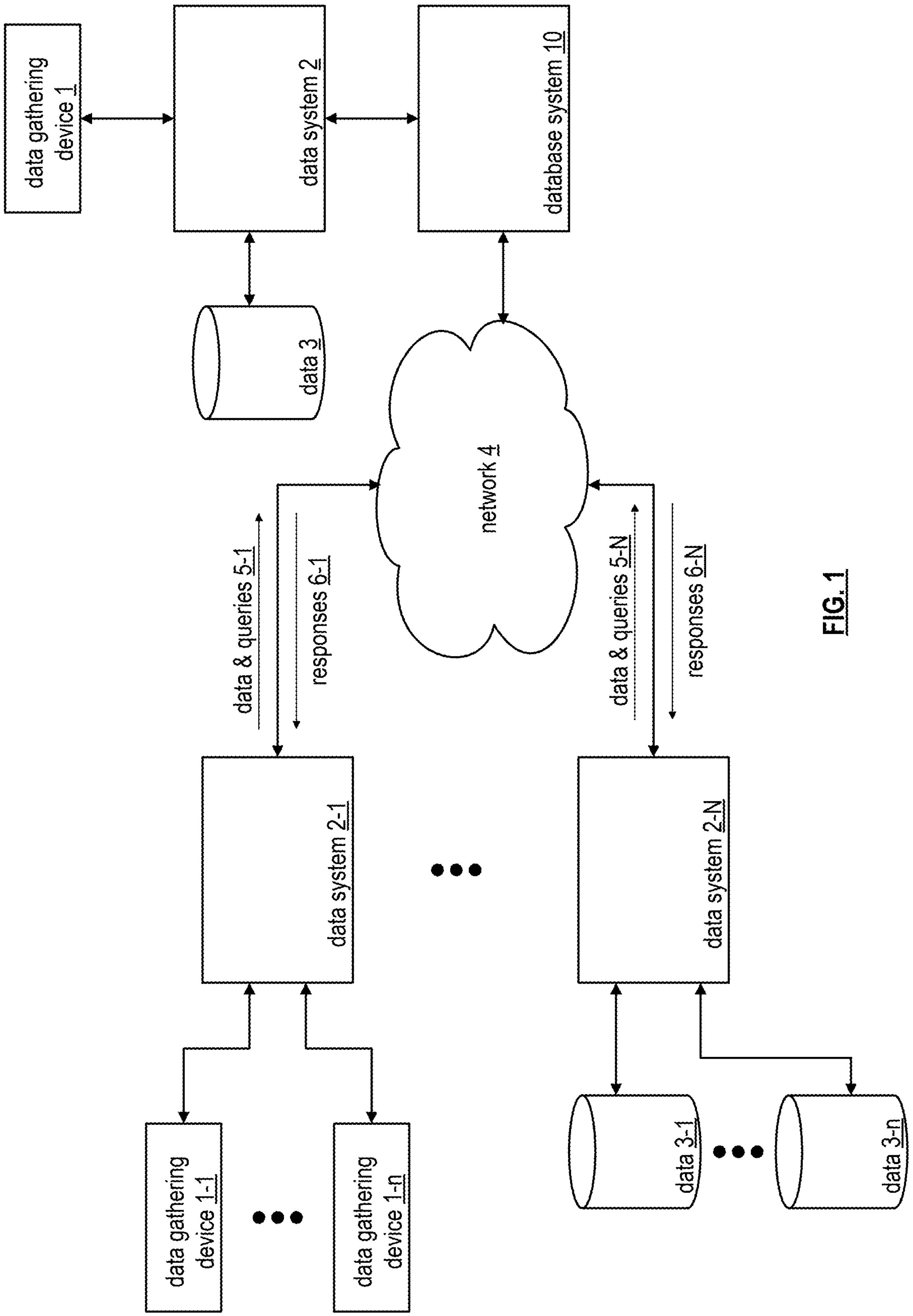
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
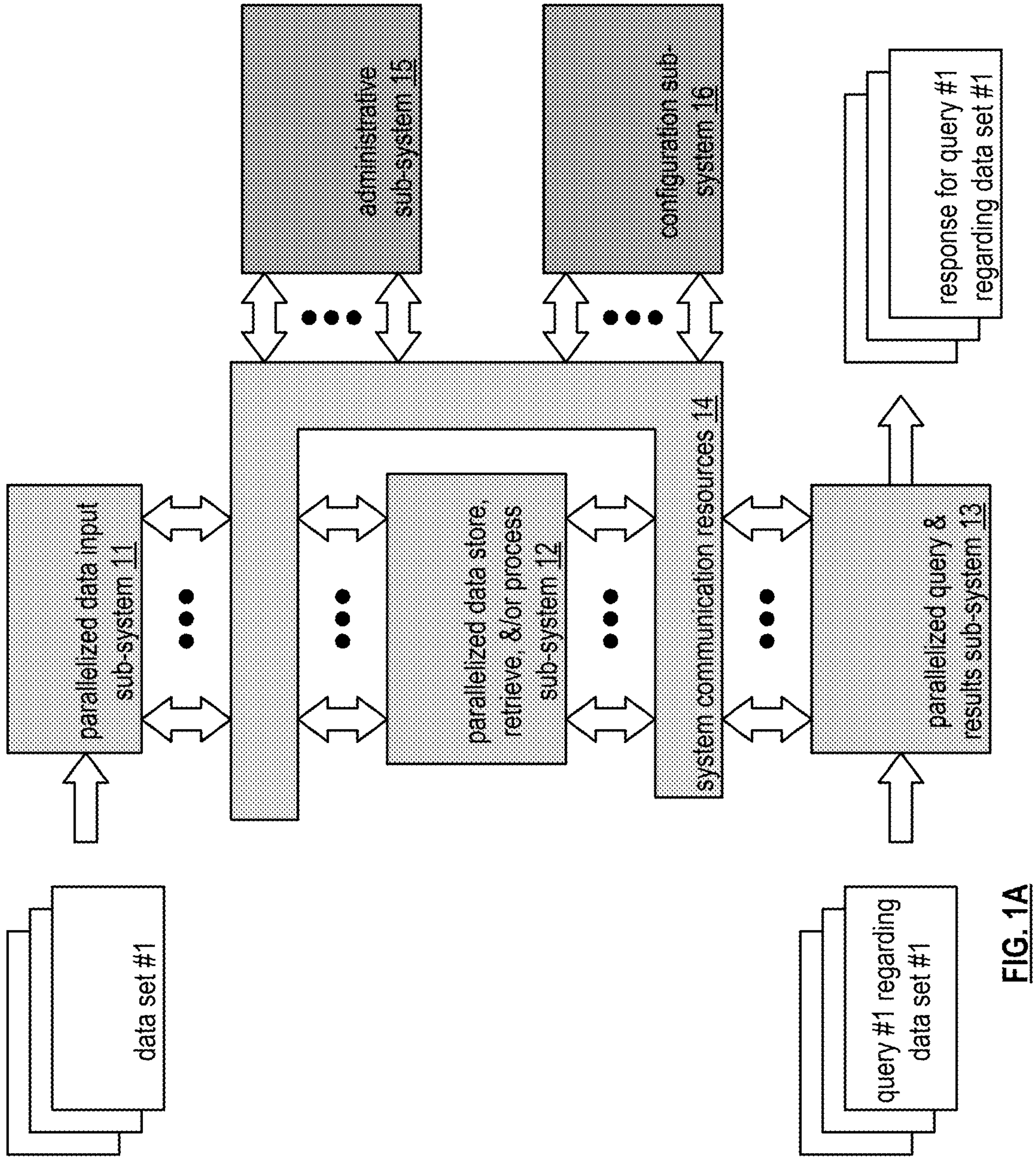
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
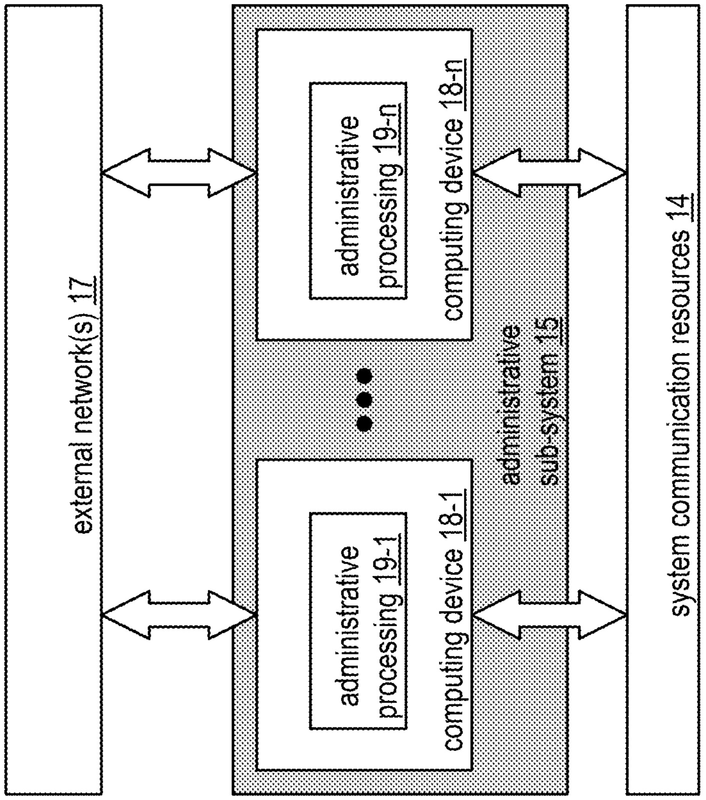
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through **18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1**A.

As will be described in greater detail with reference to one or more subsequent figures, a computing device includes a plurality of nodes, and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
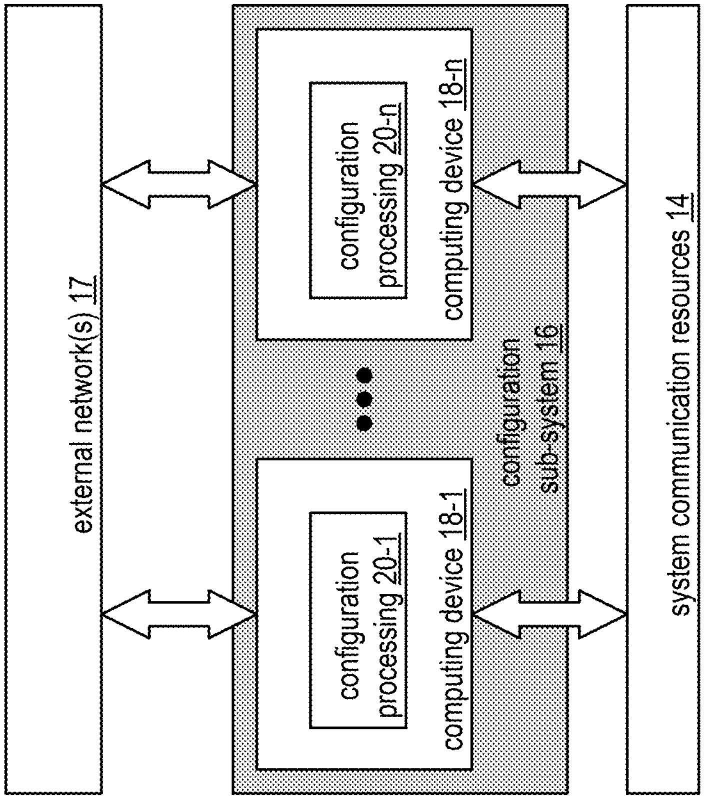
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
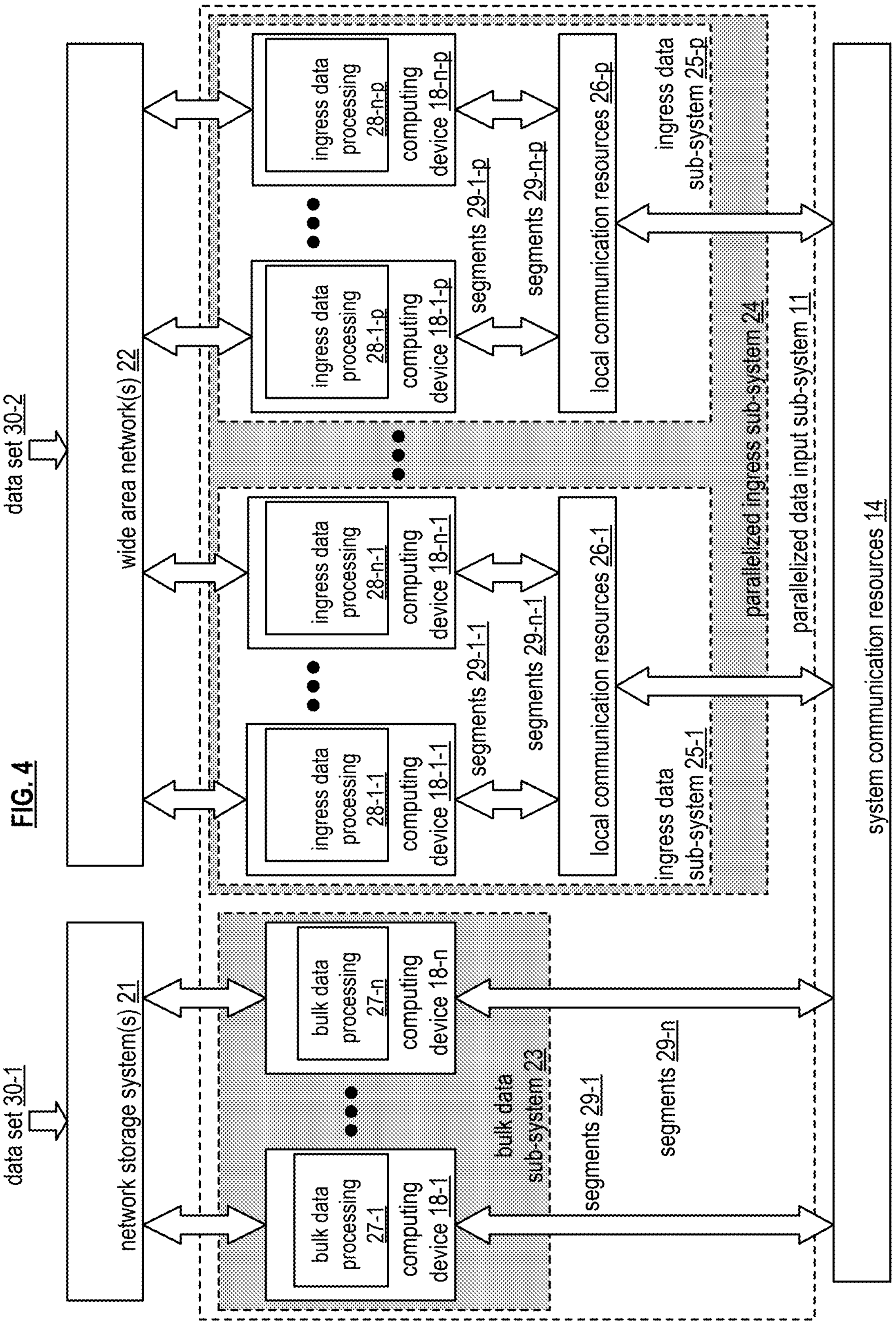
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
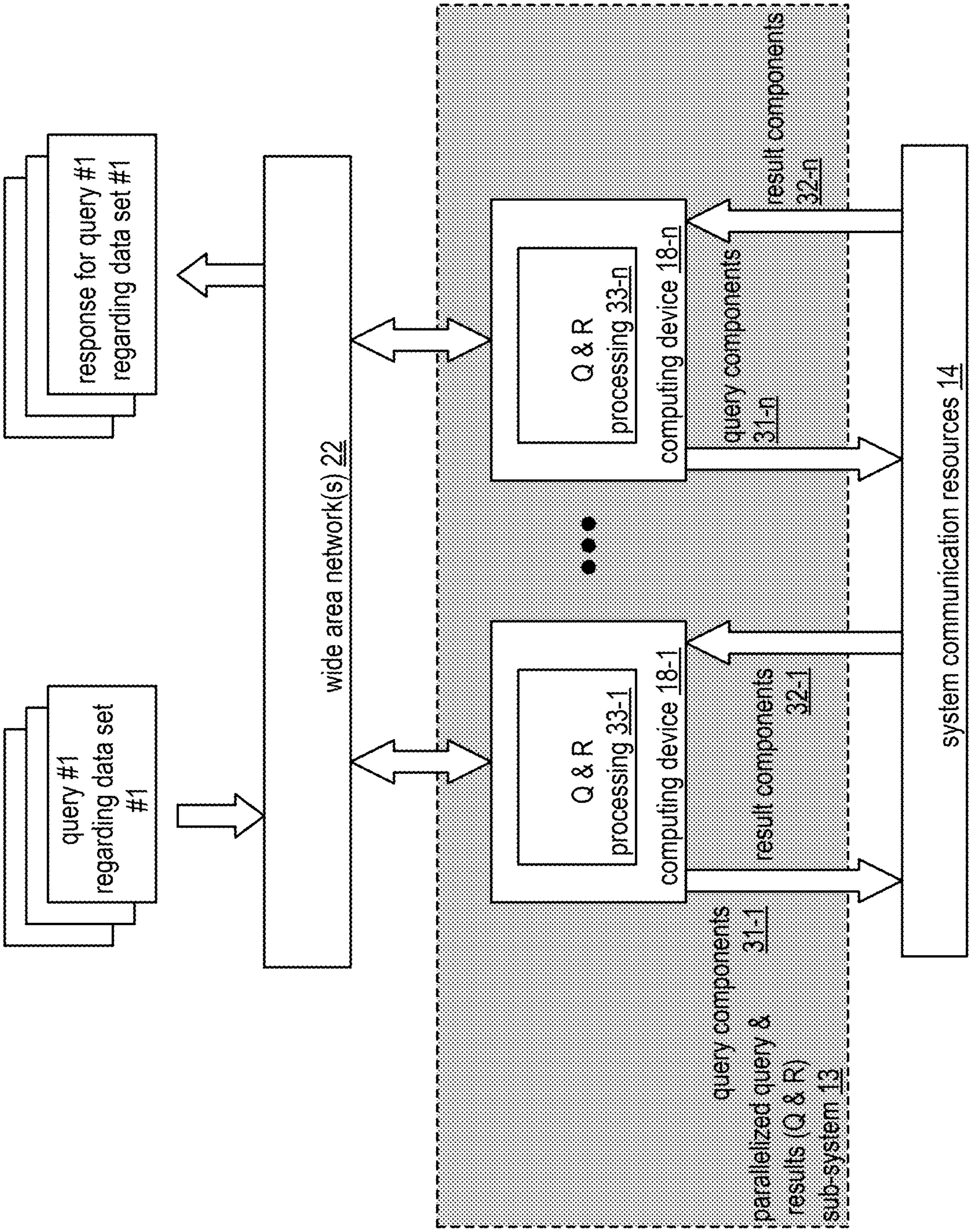
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
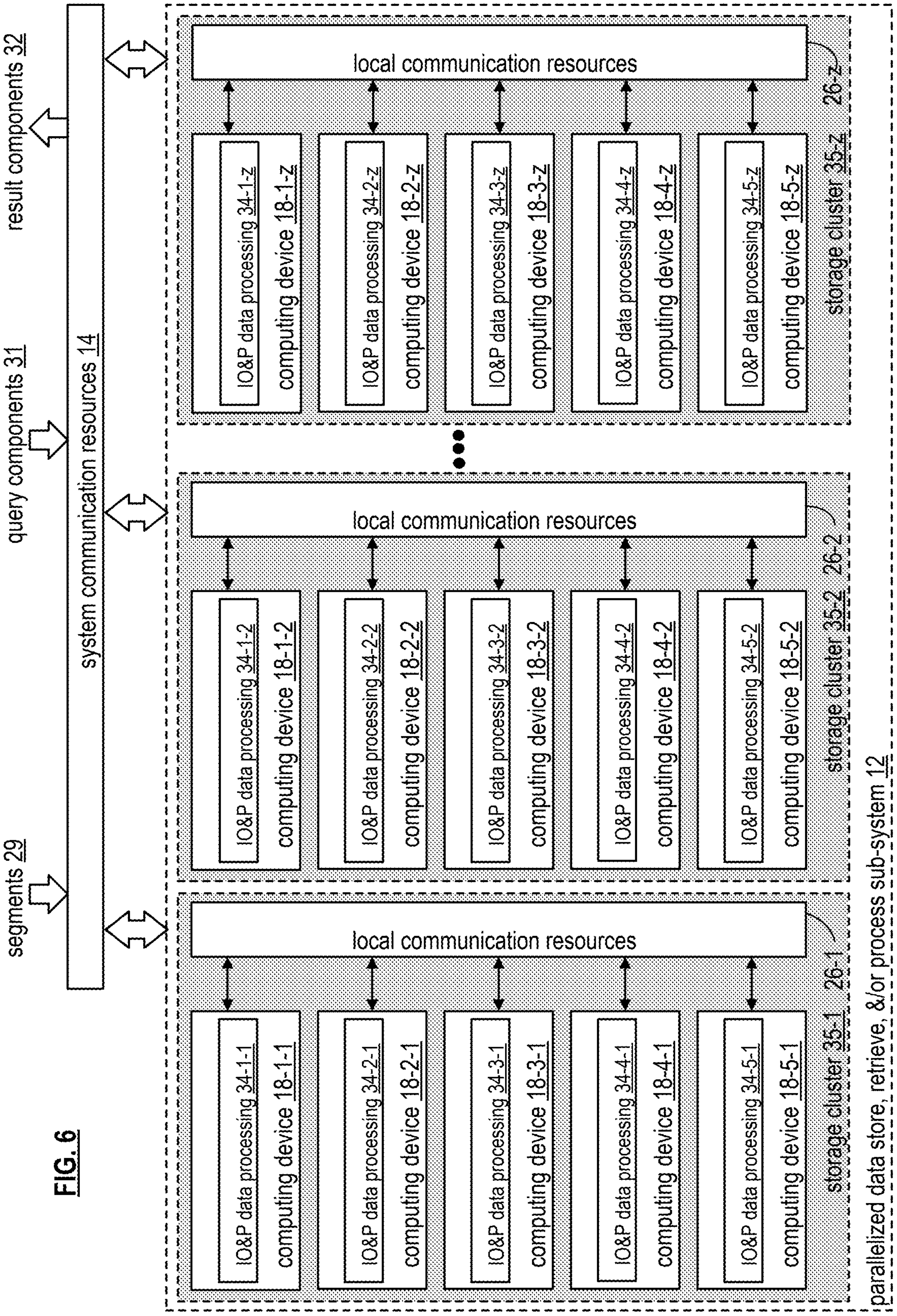
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through **35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1** is storing and/or processing a second segment group while it is storing/or and processing a first segment group.

Figure 7:
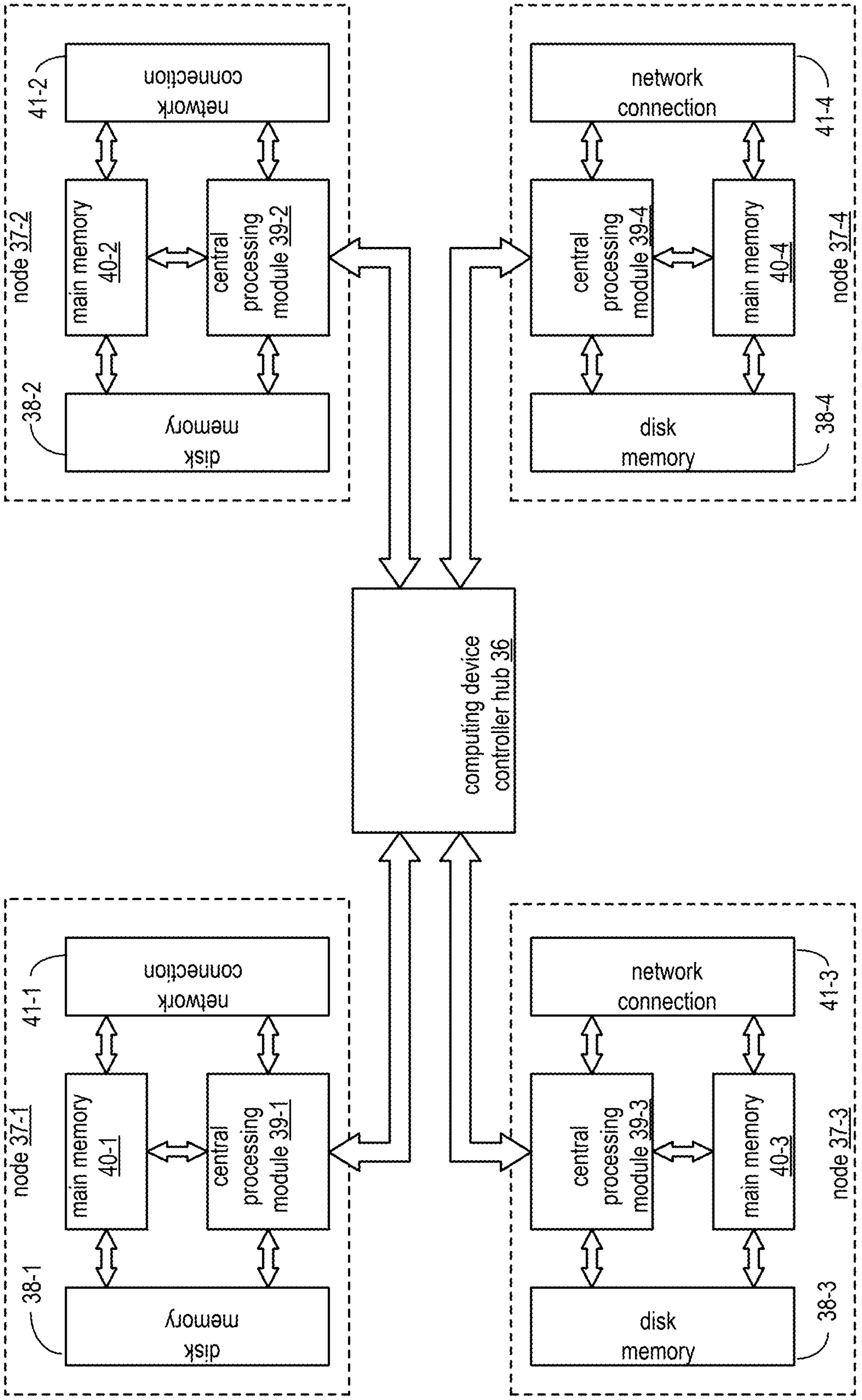
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra-path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
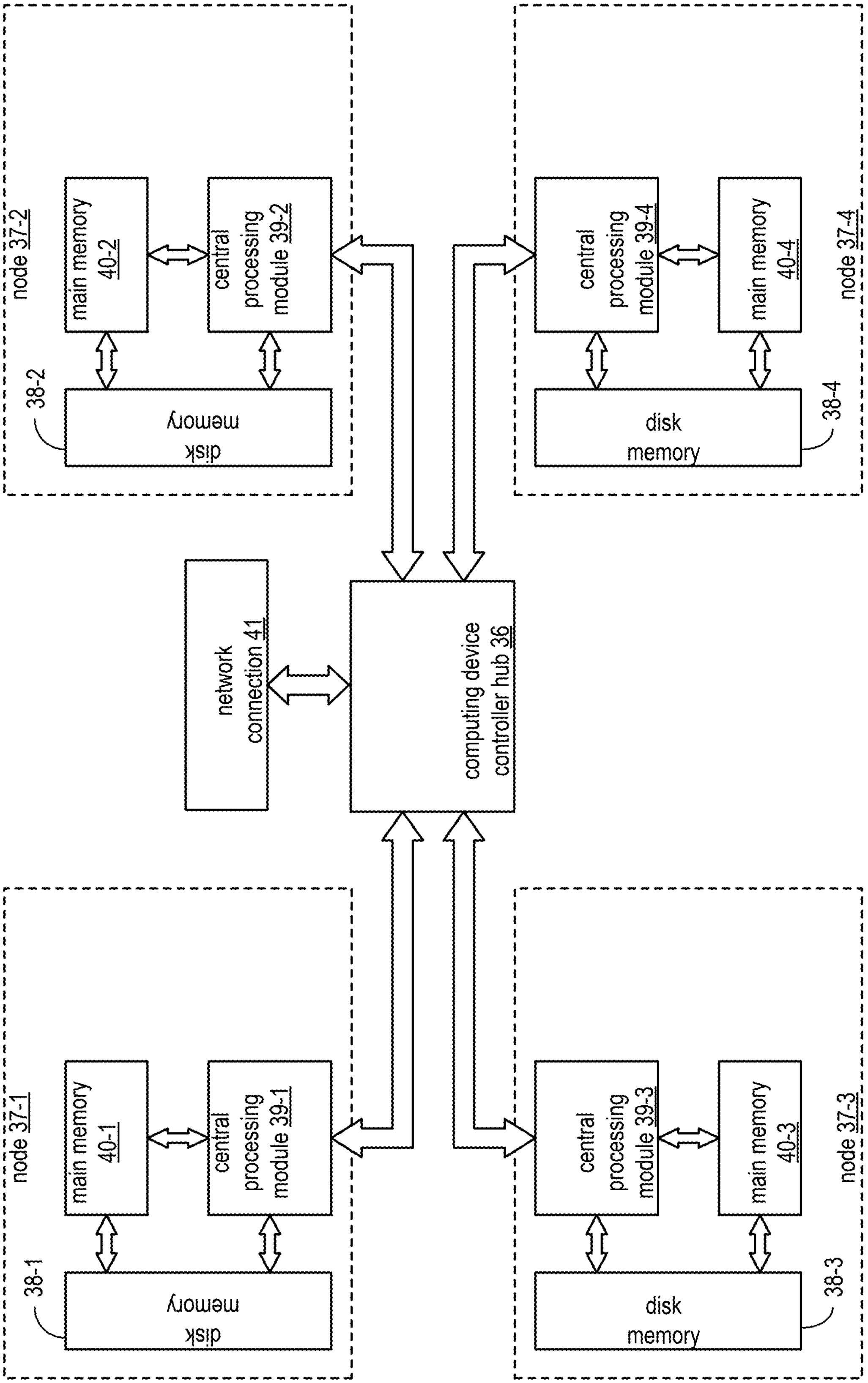
FIG. 8 is a schematic block diagram of another embodiment of a computing device in accordance with the present invention.

FIG. 8 is a schematic block diagram of another embodiment of a computing device that is similar to the computing device of FIG. 7 with an exception that it includes a single network connection 41, which is coupled to the computing device controller hub 36. As such, each node coordinates with the computing device controller hub to transmit or receive data via the network connection.

Figure 9:
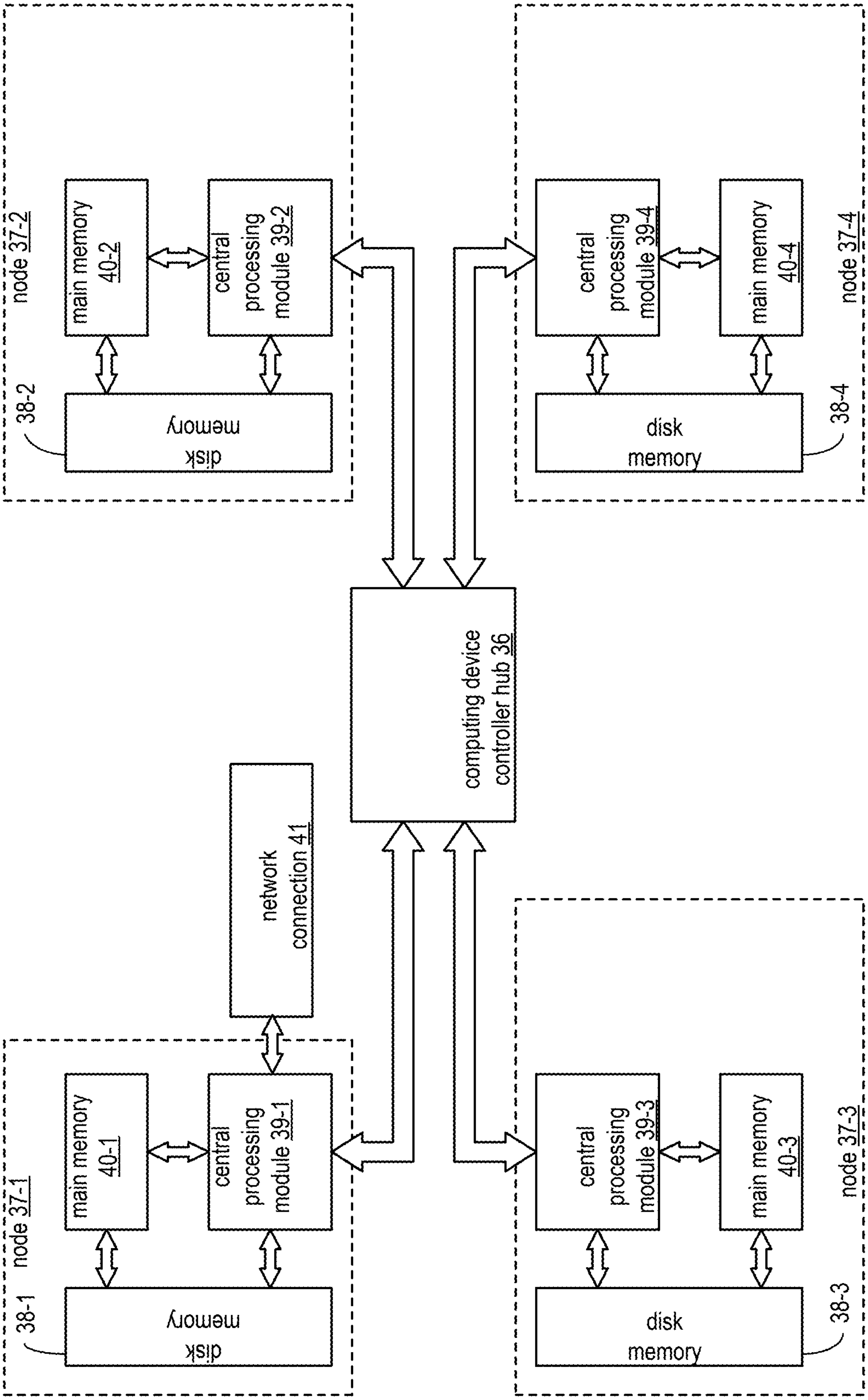
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
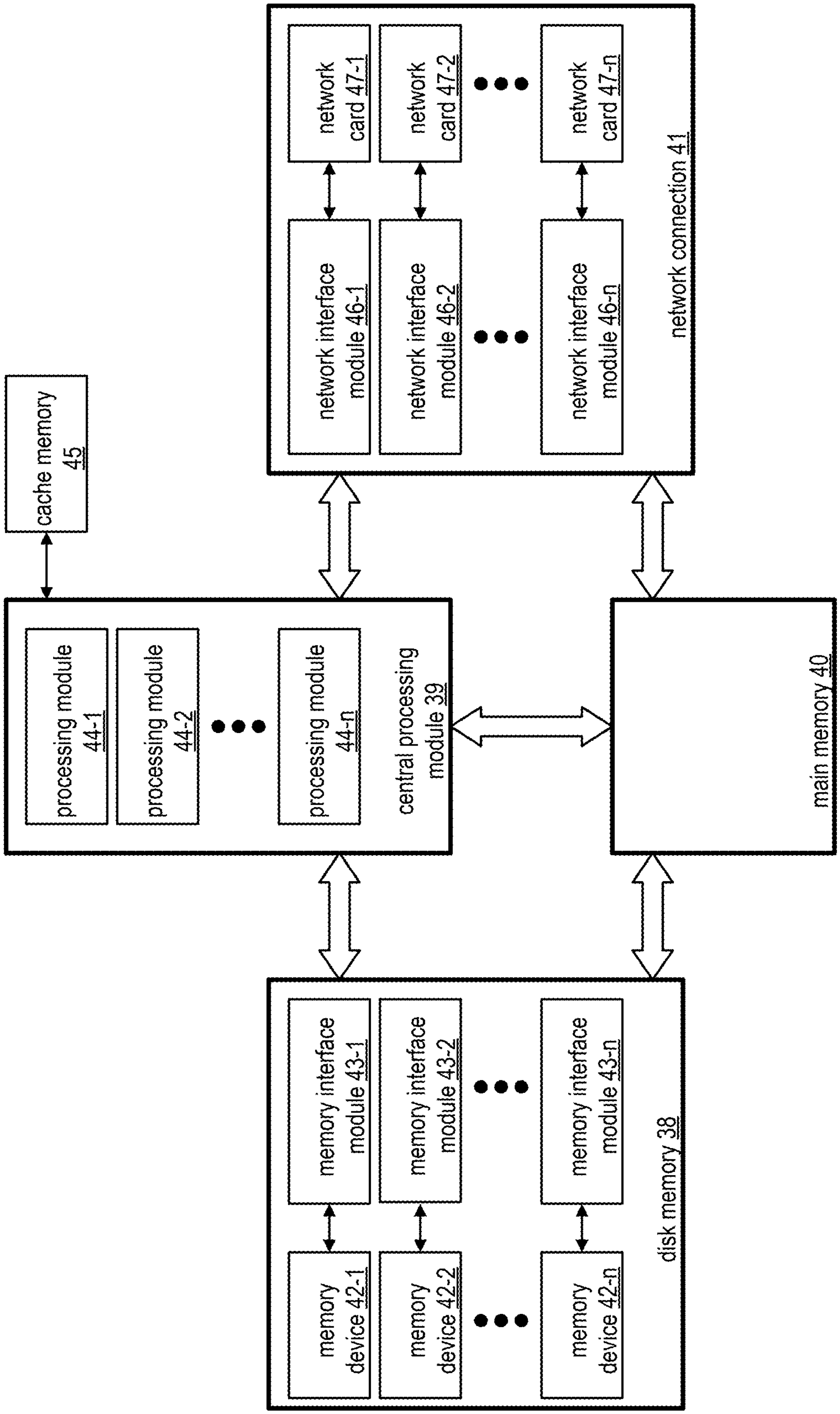
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through **44-*n* and an associated one or more cache memory 45**. A processing module is as defined at the end of the detailed description.

The disk memory 38 includes a plurality of memory interface modules 43-1 through **43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n*** is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through **46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
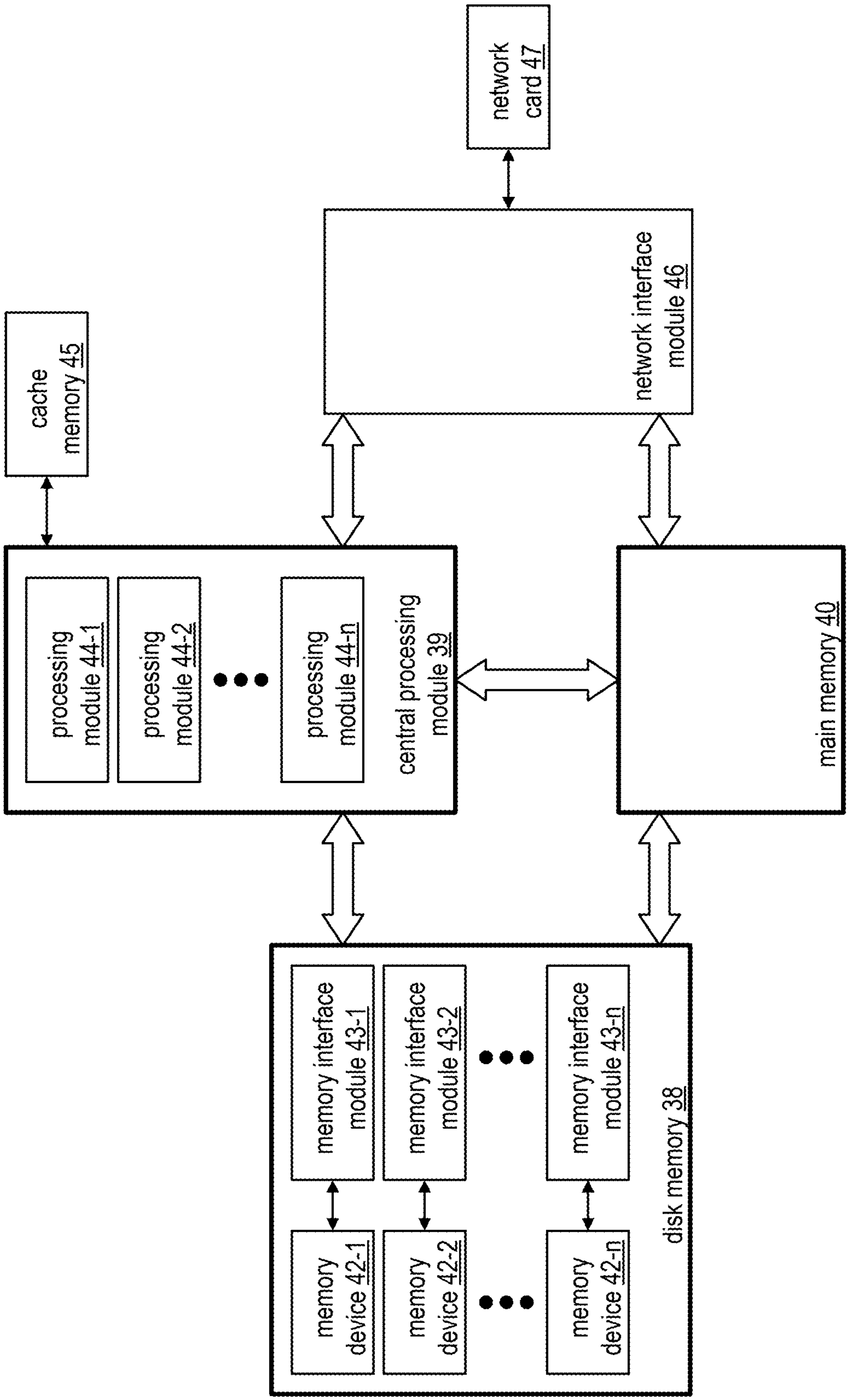
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
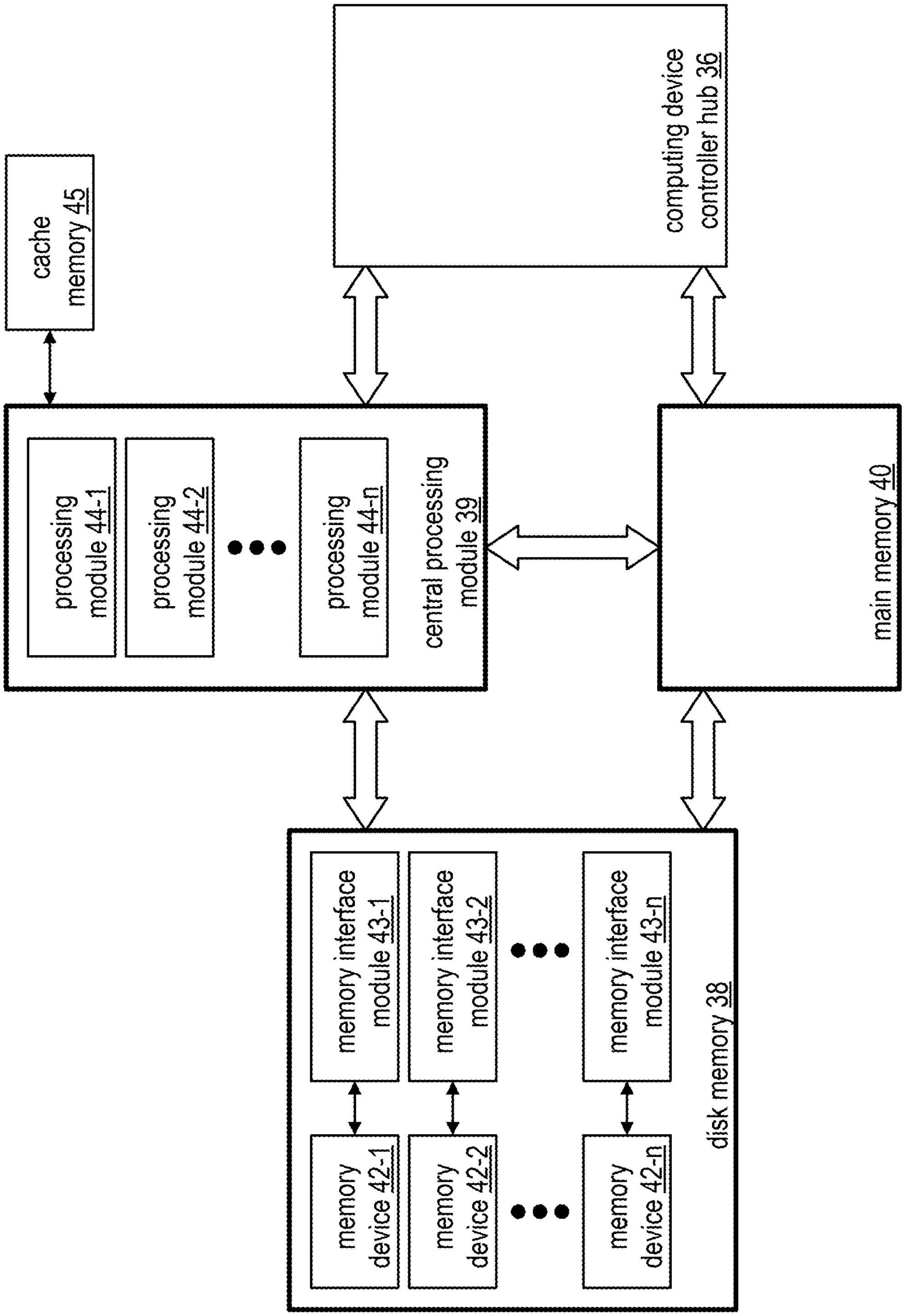
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
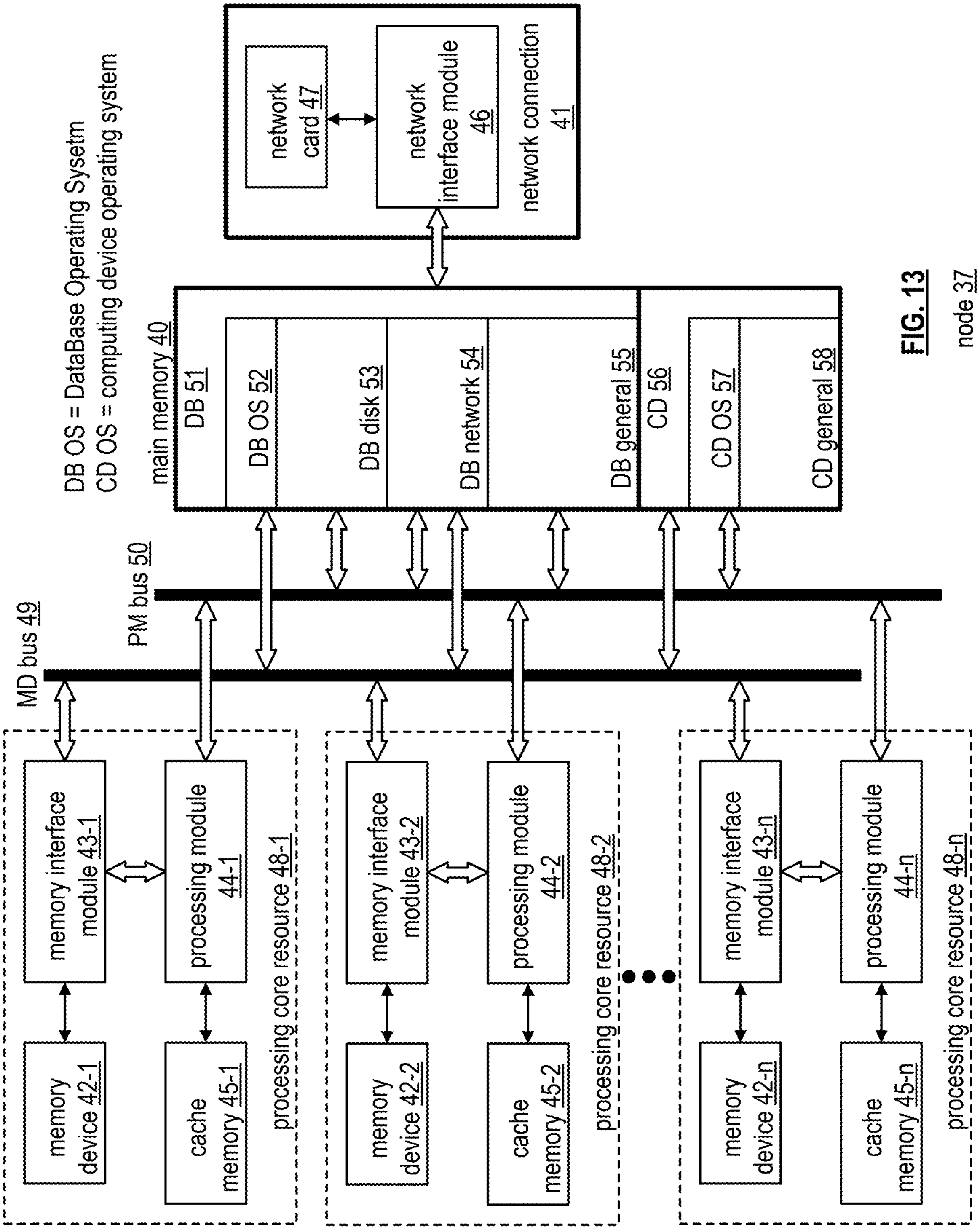
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
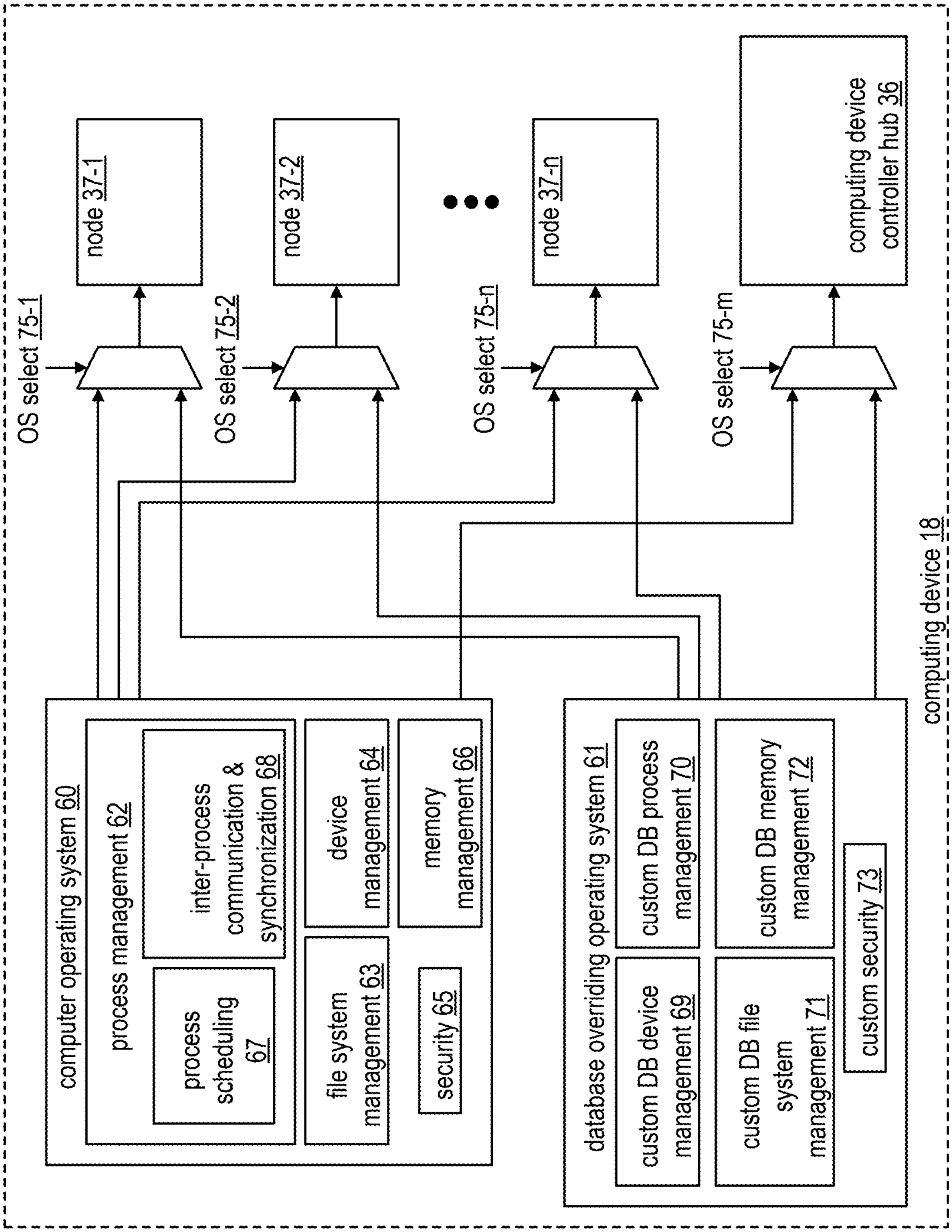
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through **75-*n* when communicating with nodes 37-1 through 37-*n* and via OS select 75-*m* when communicating with the computing device controller hub 36**). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
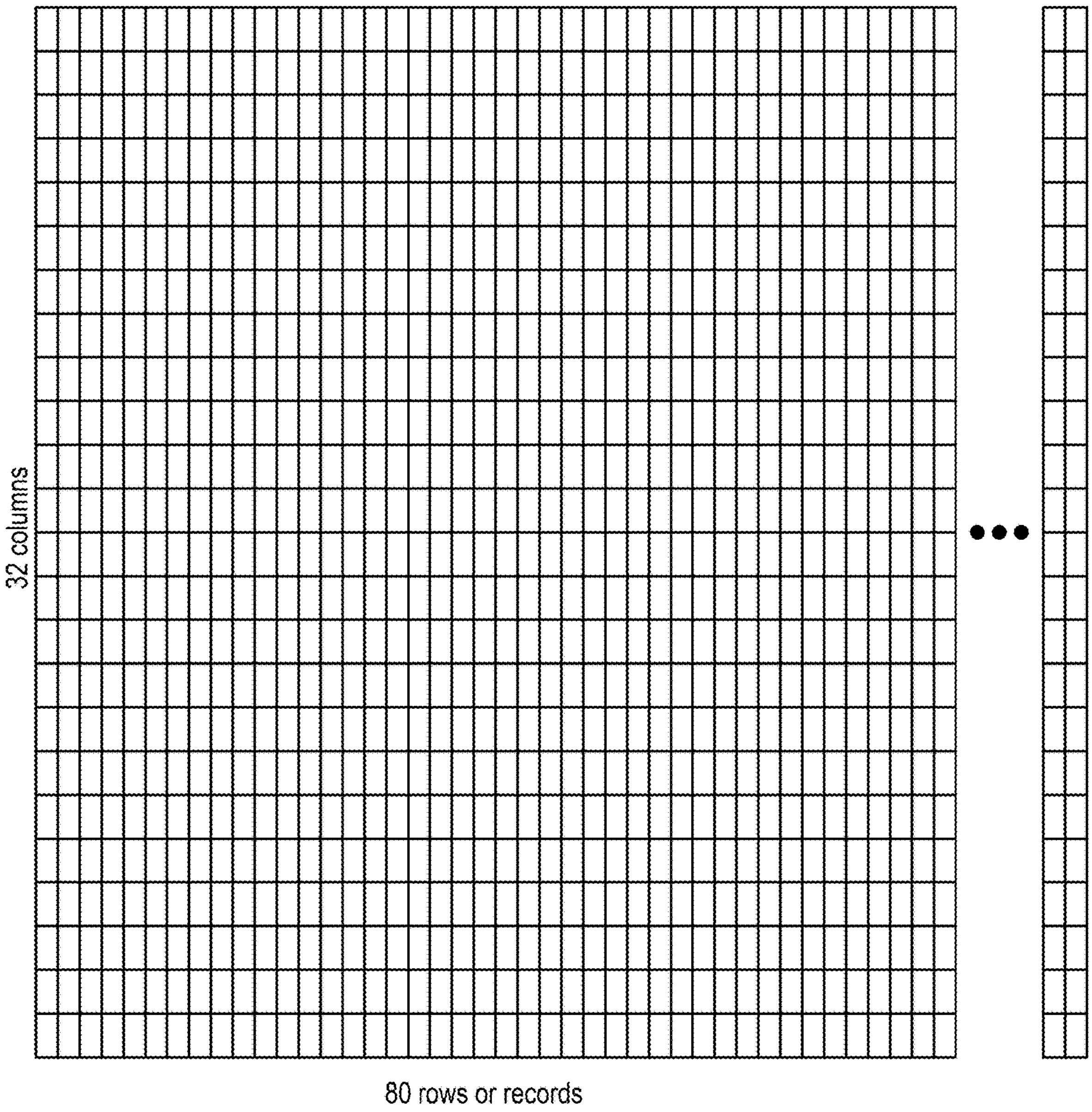
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
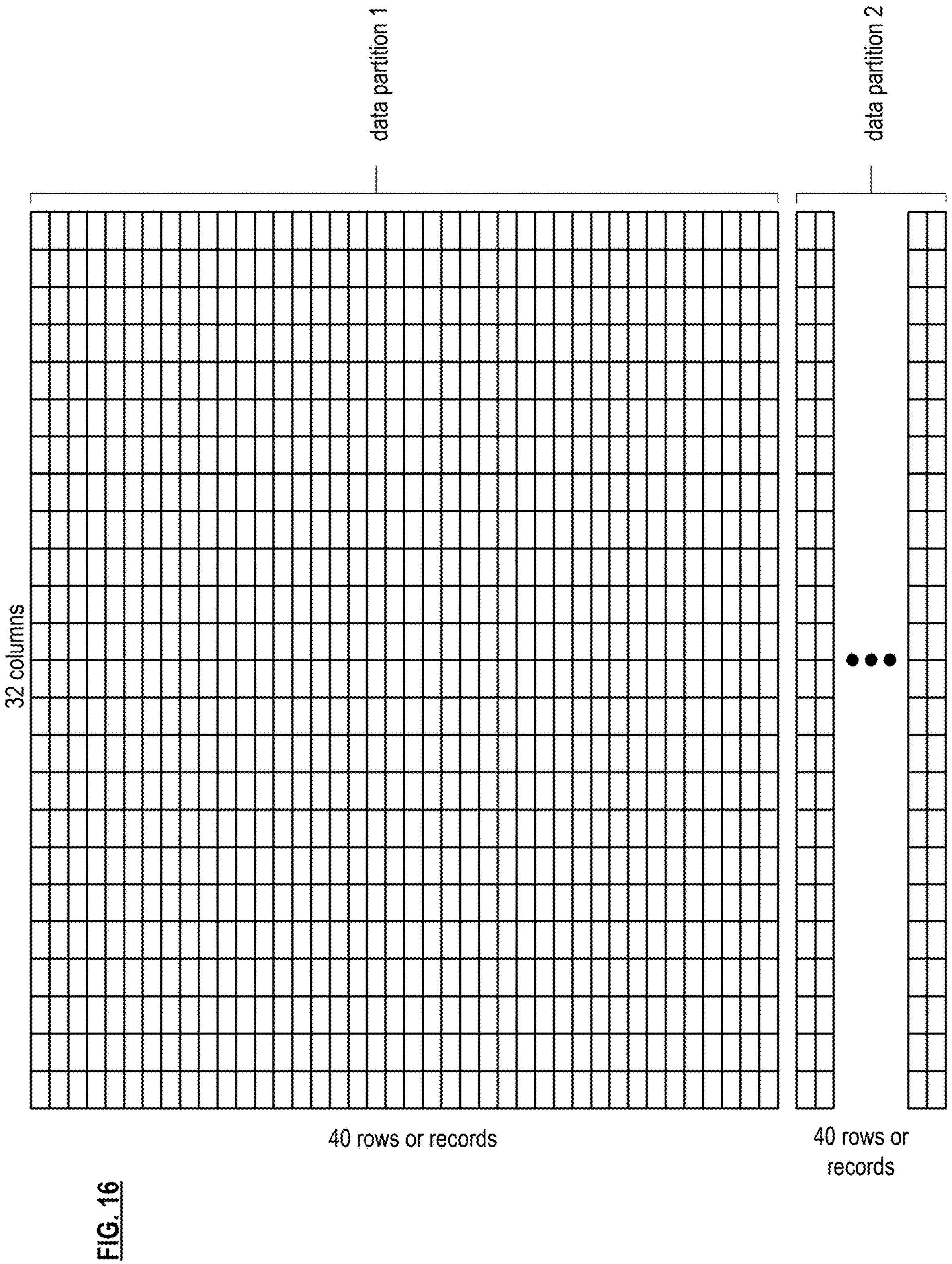

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
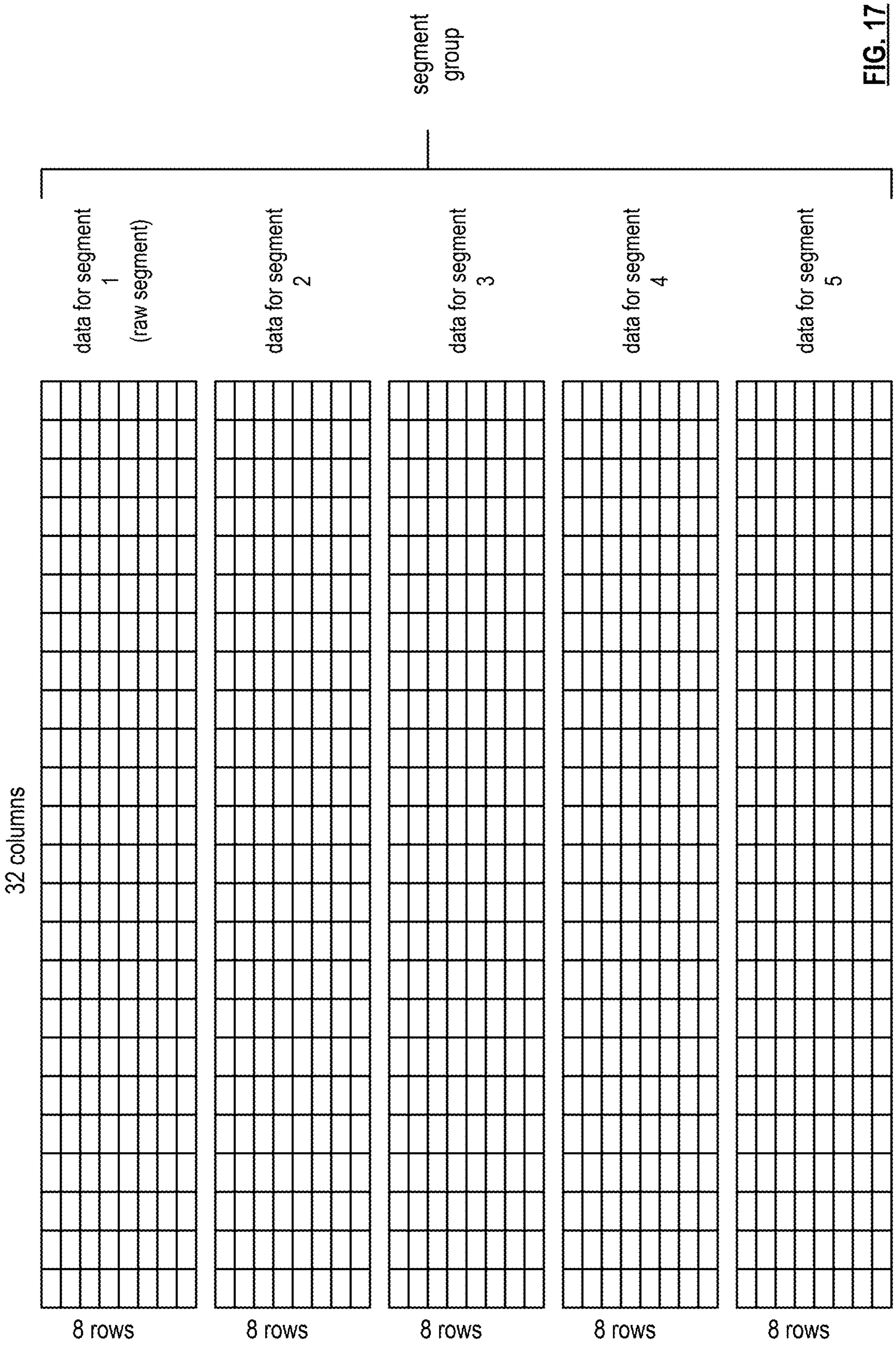

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figure 18:
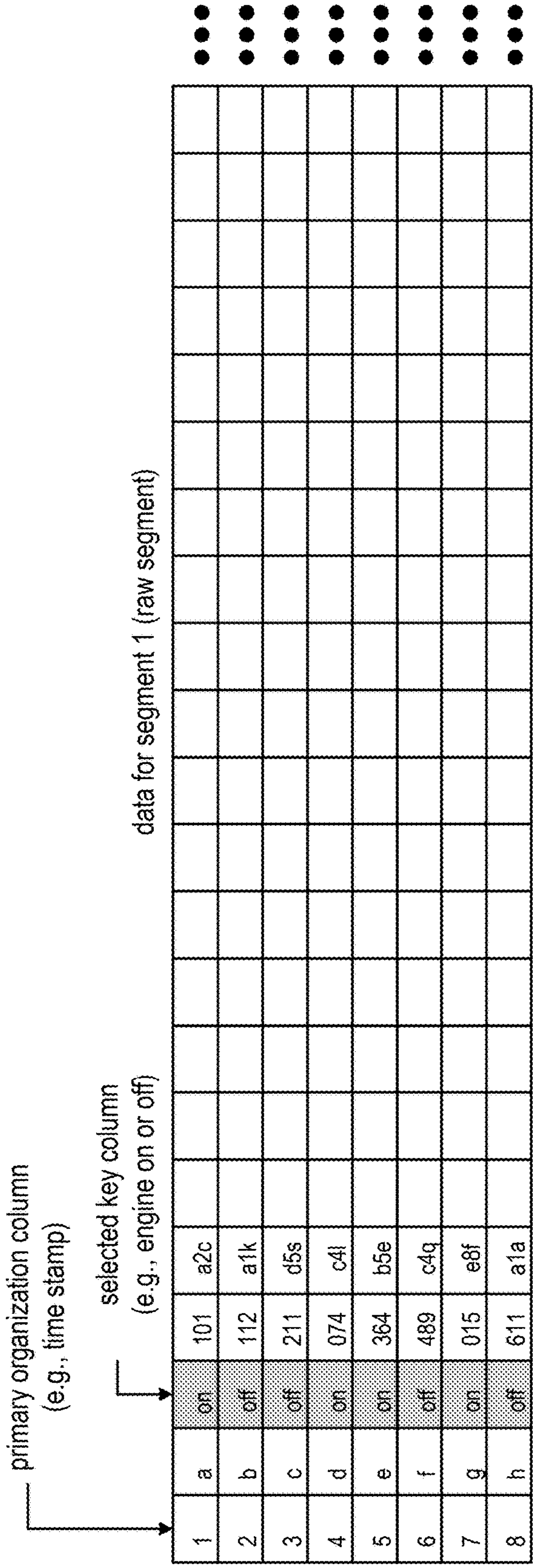

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.) As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

Figure 19:
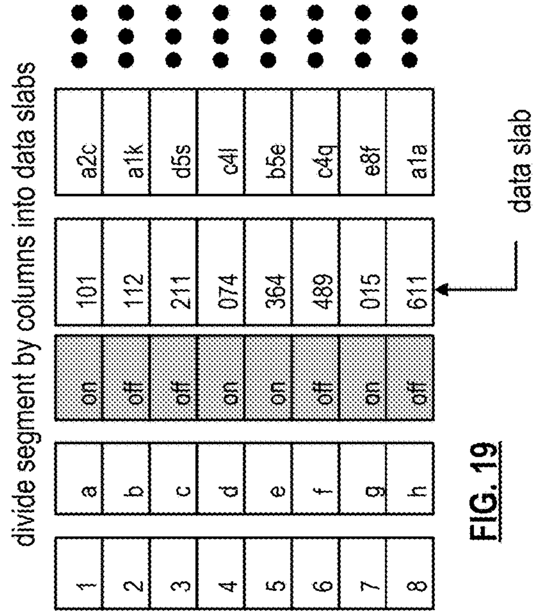

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

Figure 20:
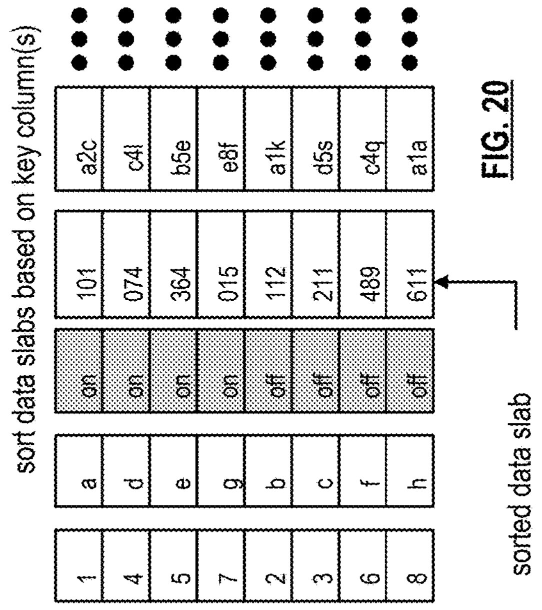

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
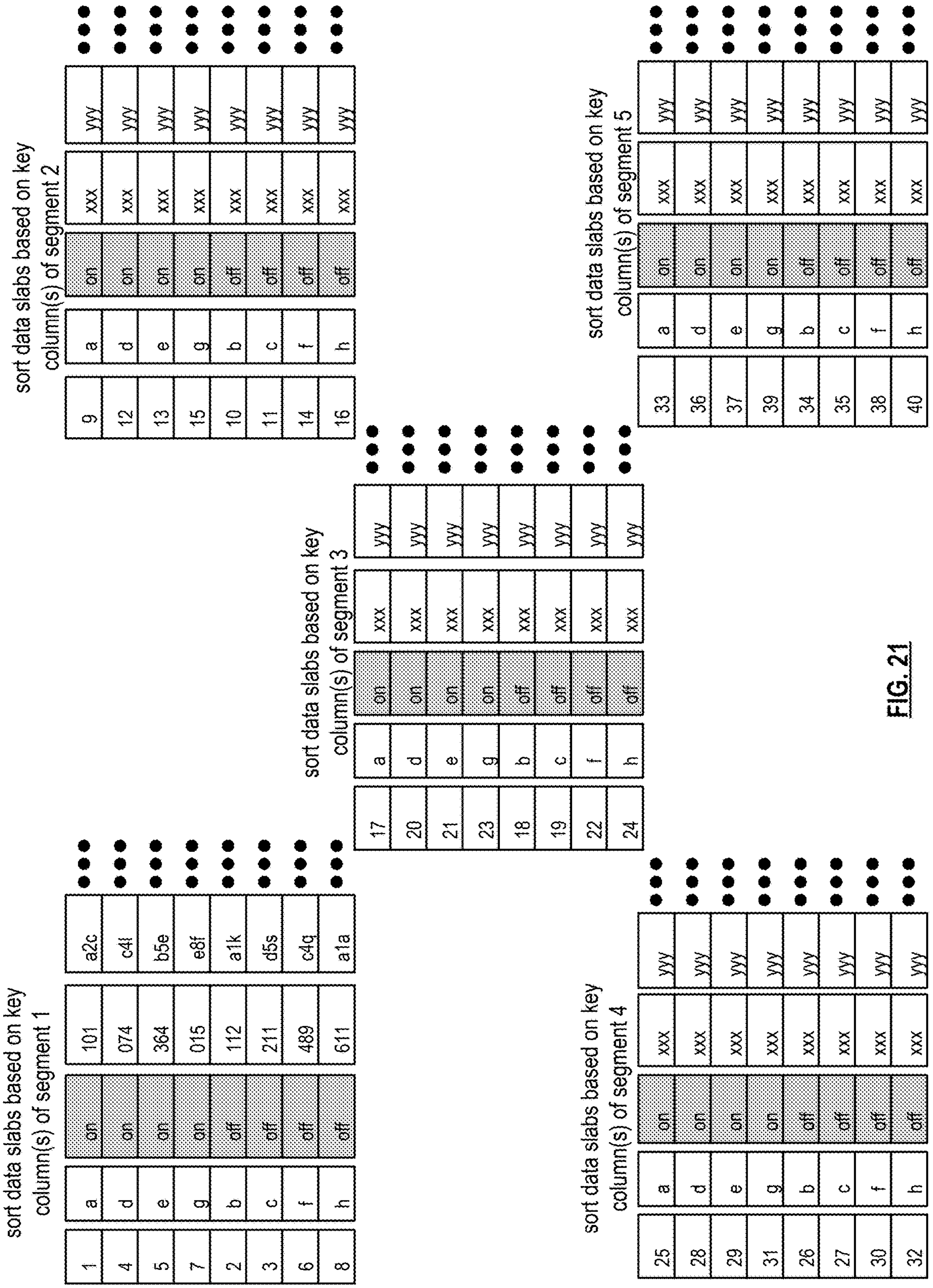

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
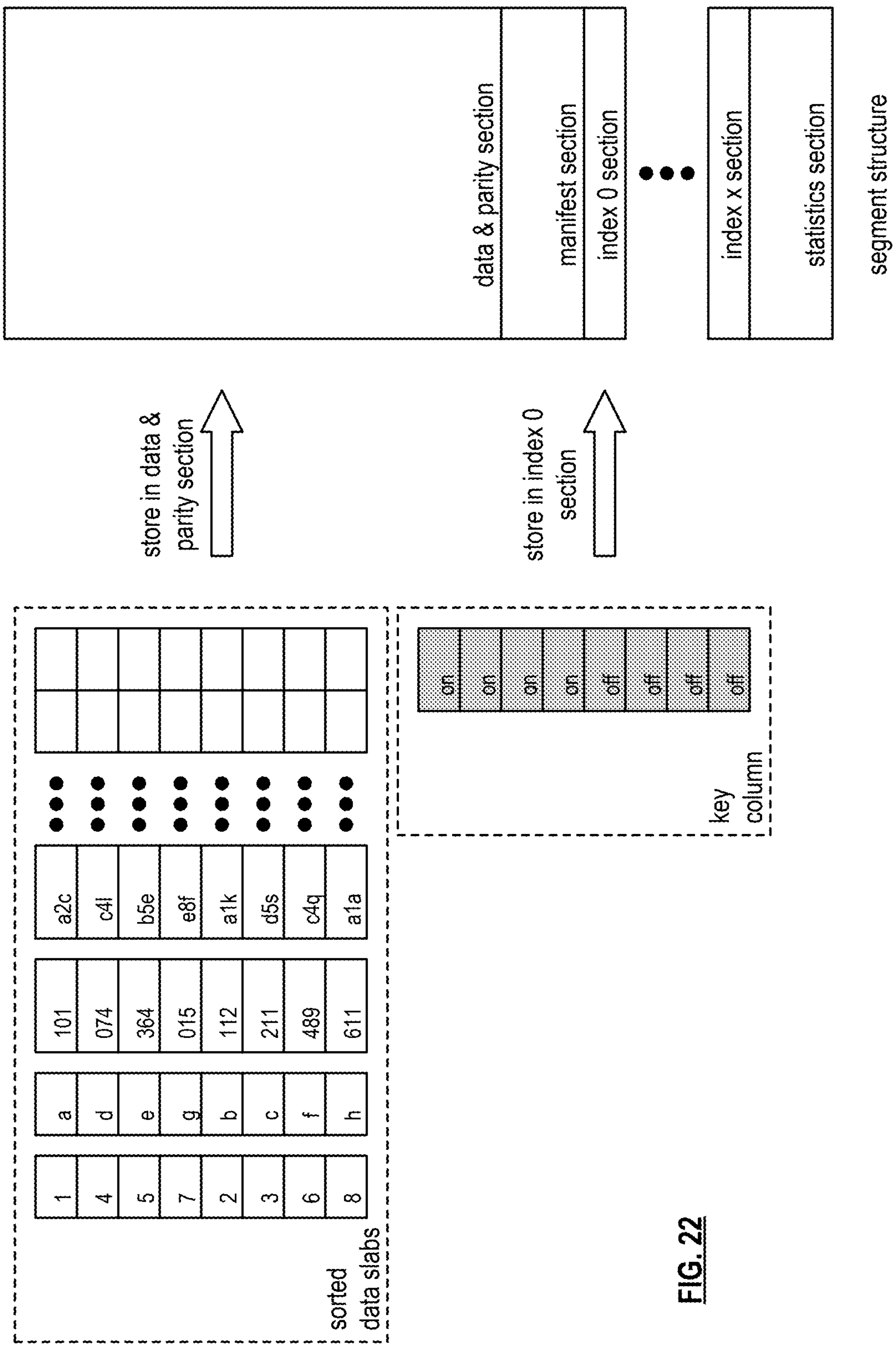

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.).

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
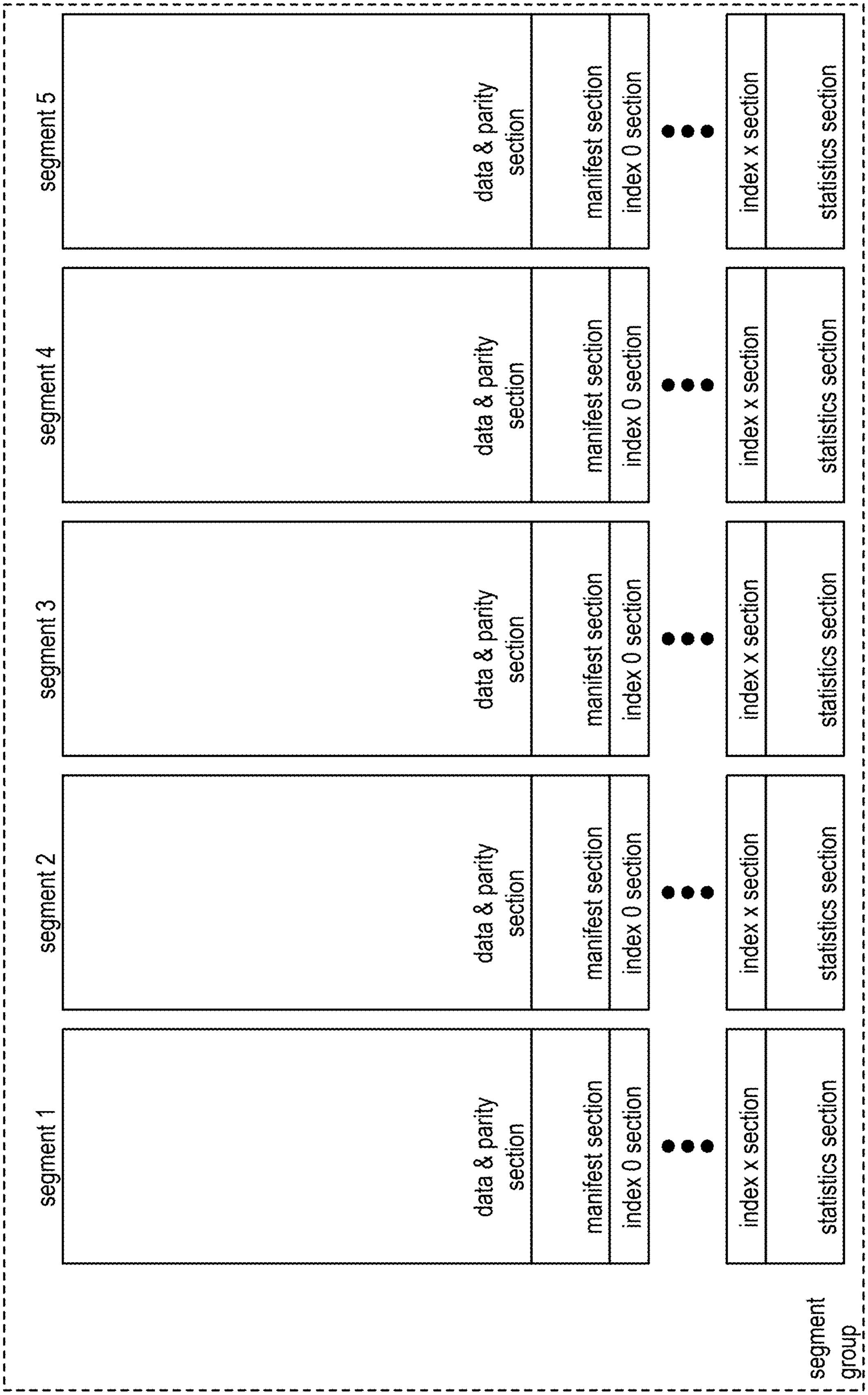

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
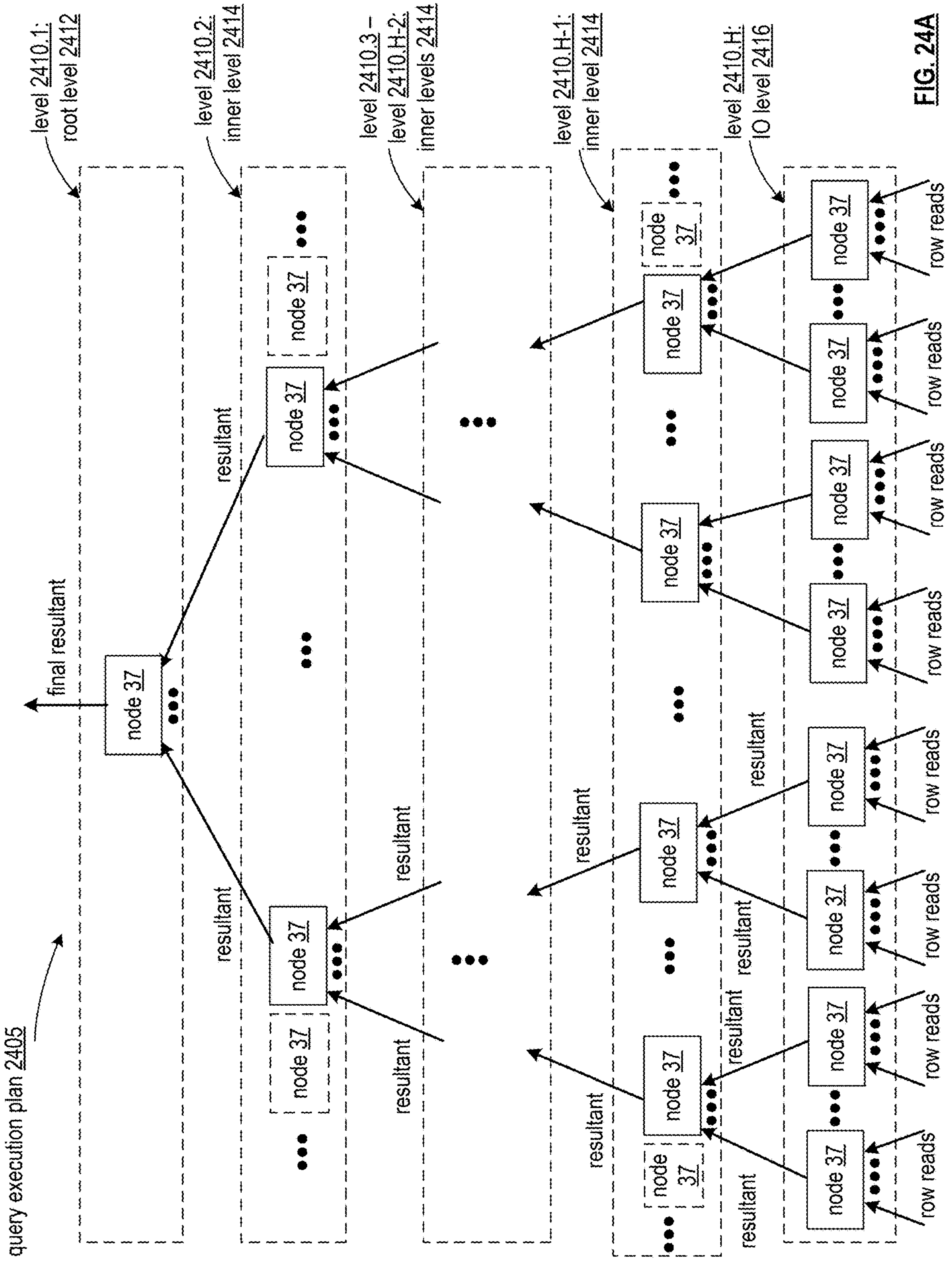
FIG. 24A is a schematic block diagram of a query execution plan in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H−1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
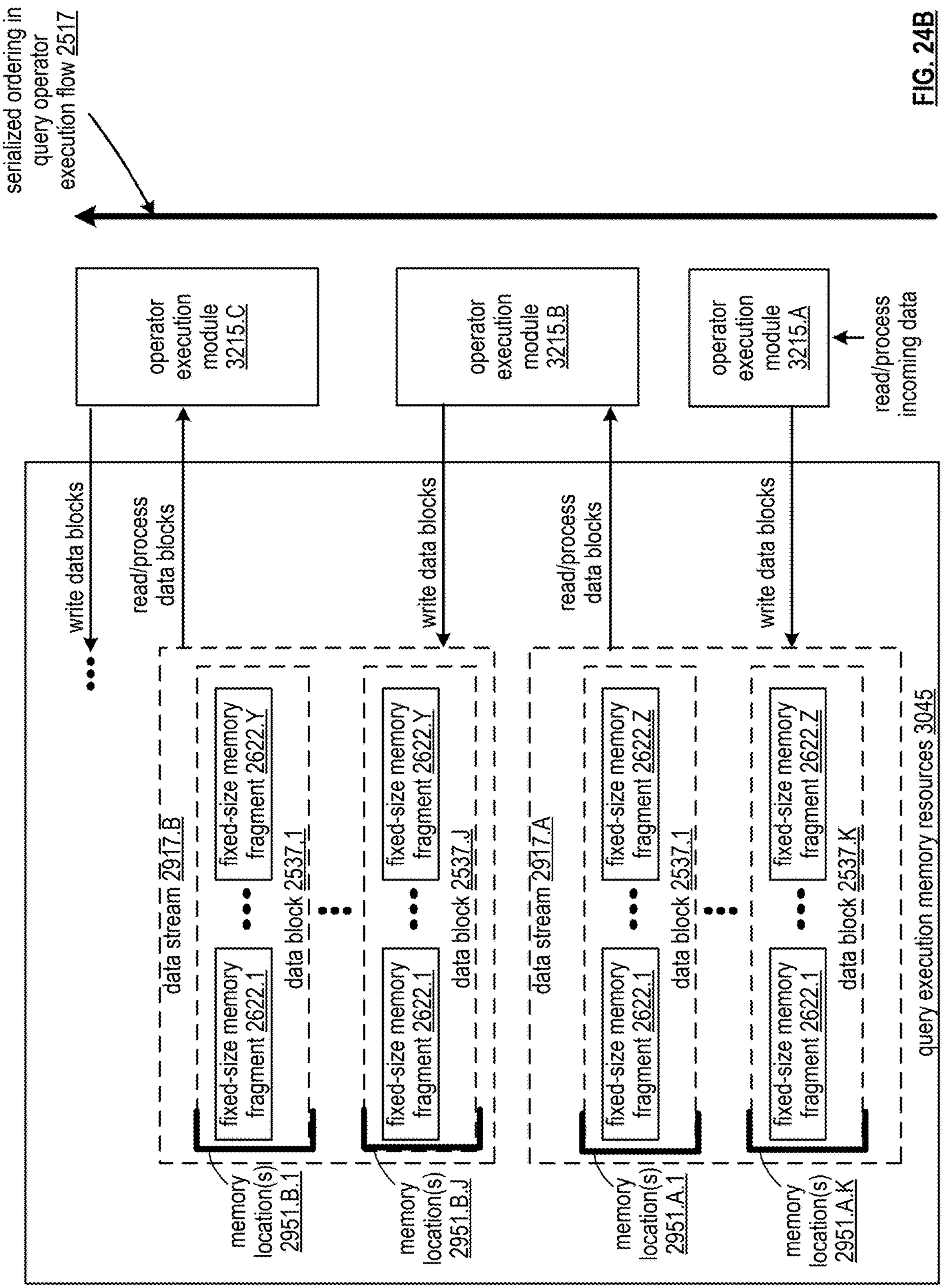
FIG. 24B is a schematic block diagram of a query execution module illustrating writing and processing of data blocks by operator execution modules in accordance with various embodiments.

FIG. 24B illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24B can implement the operator execution modules and/or can implement any query execution described herein. The data blocks 2537 can implement the data blocks of column streams and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

Figure 24C:
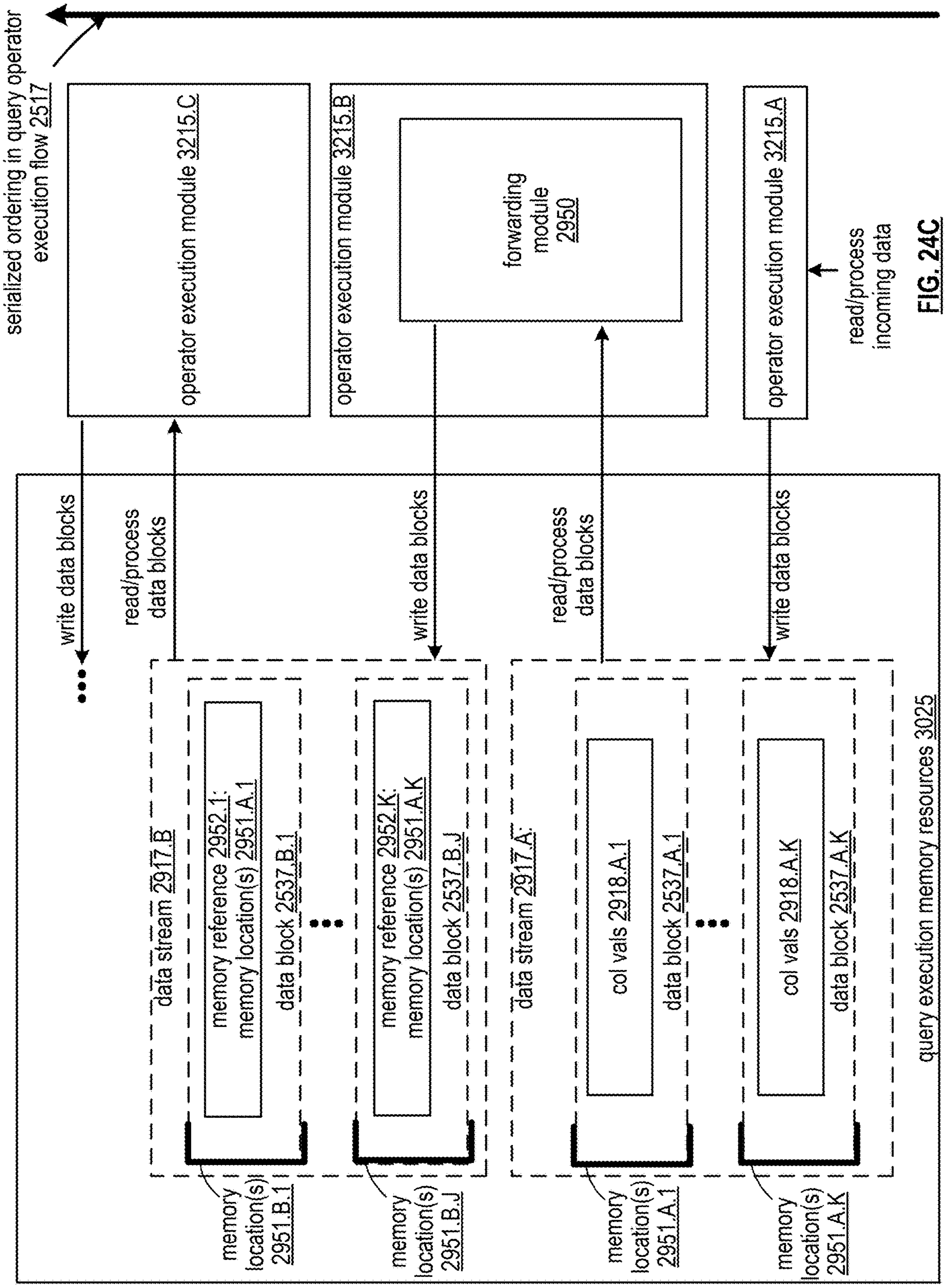
FIG. 24C is a schematic block diagram of a query execution module illustrating writing and processing of data blocks by an operator execution module that implements a forwarding module in accordance with various embodiments.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams. An example of such an embodiment is illustrated in FIG. 24C.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIG. 24A, and/or rather than passing this large data to other nodes 37 for processing, for example, from IO level nodes 37 to inner level nodes 37 and/or between any nodes 37 as illustrated in FIG. 24A, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

FIG. 24C illustrates an example where a data stream 2910 generated by one operator execution module 3215 is forwarded by another operator execution module 3215 via a forwarding module 2950. The data stream 2917.A of FIG. 24C can be implemented as the data stream 2916.A of FIG. 24B and/or the data stream 2917.B of FIG. 24C can be implemented as the data stream 2916.B of FIG. 24B.

As illustrated in the example of FIG. 24C, data block 2537.1-2537.J are generated based on forwarding 2537.1-2537.K by a forwarding module 2950 based on writing data blocks 2537.1-2537.J to include a reference to a corresponding one of the set of memory locations 2951.A.1-2959.A.K, for example, where data block 2537.B. 1 indicates memory location of memory locations 2951.A.1, where data block 2537.B.2 indicates memory location of memory locations 2951.A.2, etc. For example, the value of J is equal to the value of K. This can be favorable over reading and copying all of the values 2918, particularly if the values 2918 and/or corresponding set of rows remain unchanged in the operator execution. In other embodiments where data blocks are fixed size, the value of J is far fewer than K, where multiple memory references 2952 and/or corresponding memory reference 2954 are included in the same data block 2537 based on being significantly smaller than the referenced values themselves. Some or all forwarding of column values/column streams described herein can optionally implement some or all features and/or functionality of FIG. 24C.

Figure 25A:
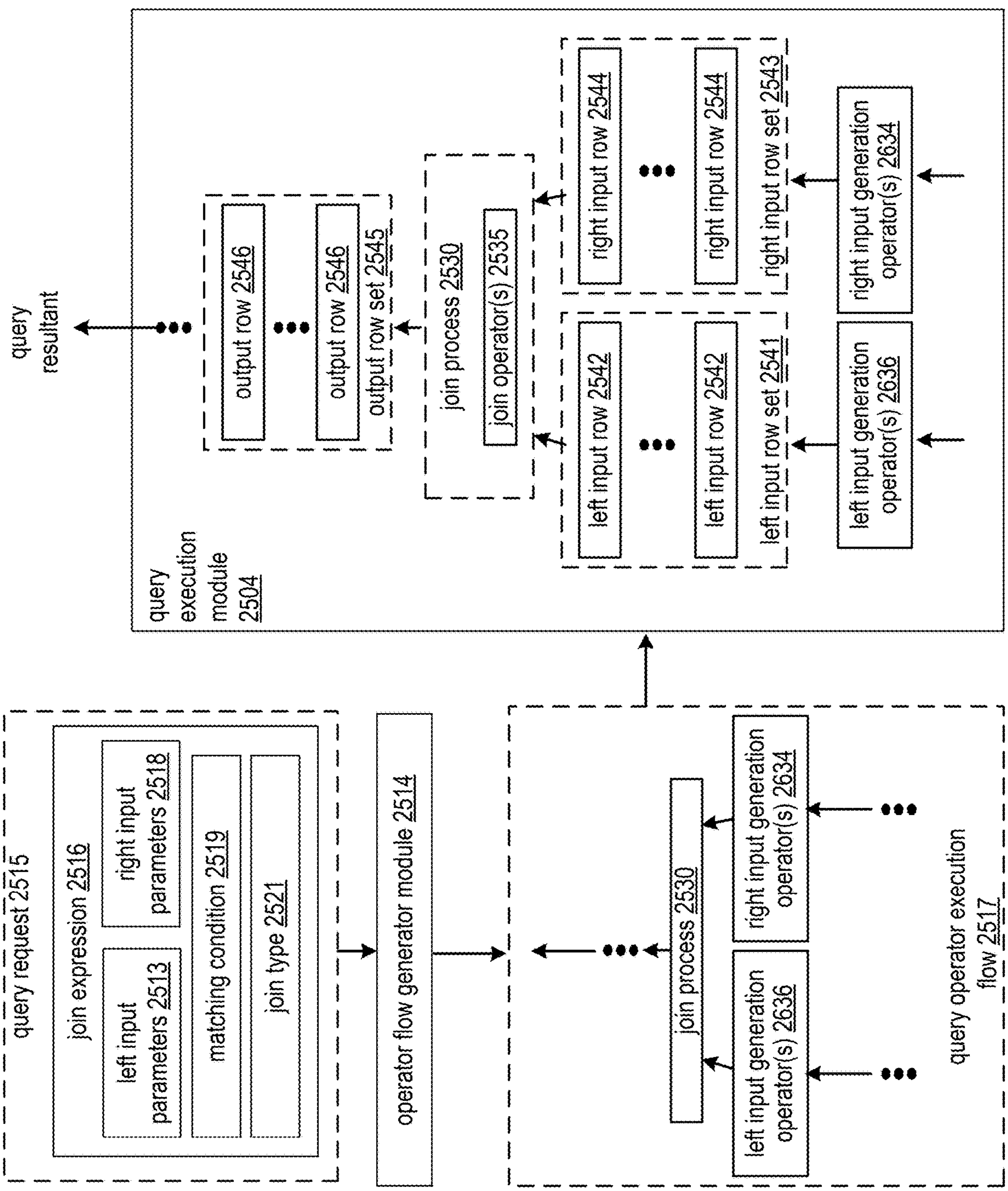
FIG. 25A is a schematic block diagram of a database system executing a join process based on a join expression of a query request in accordance with various embodiments.
Figure 25B:
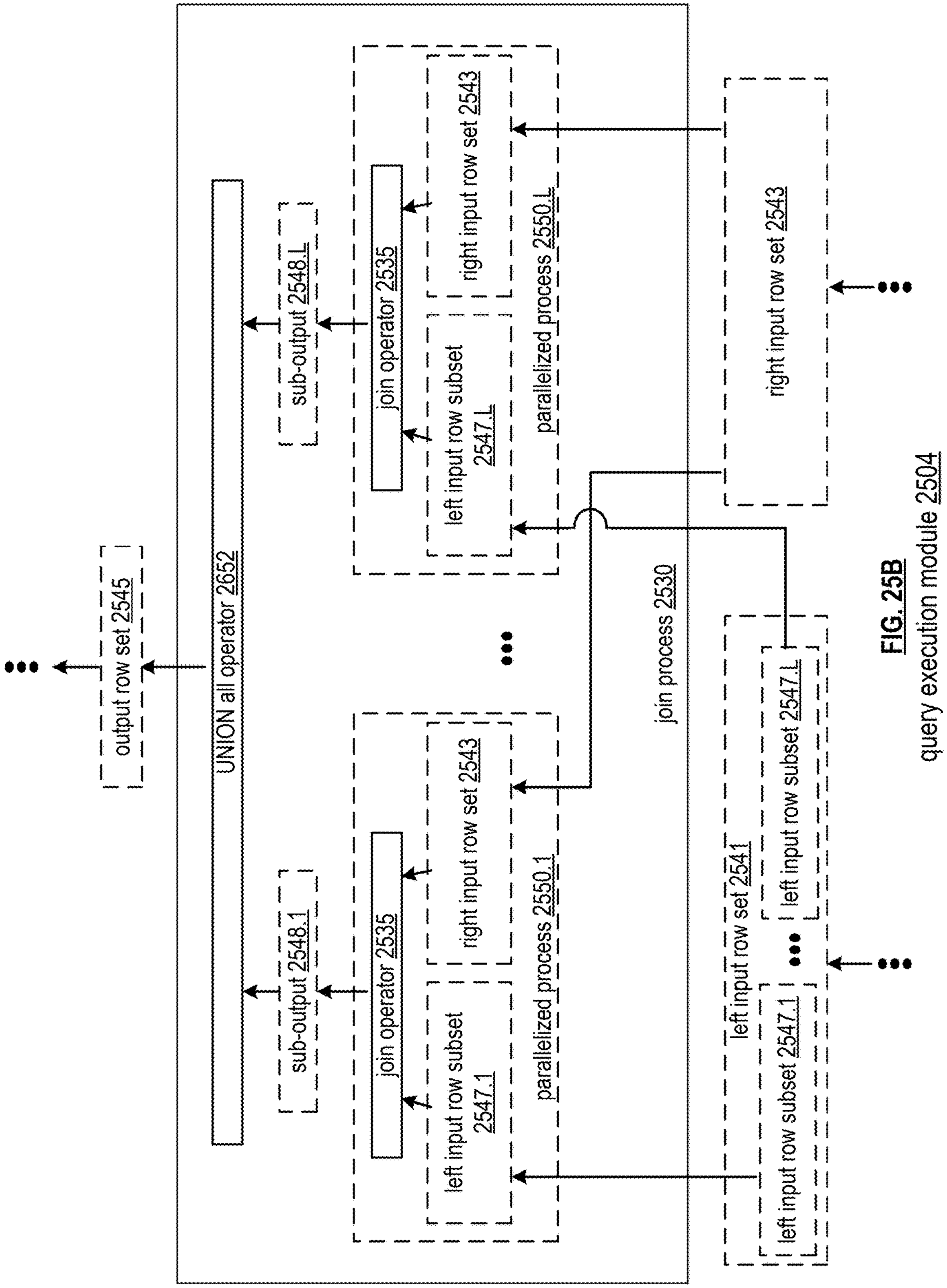
FIG. 25B is a schematic block diagram of a query execution module executing a join process via multiple parallel processes in accordance with various embodiments.
Figure 25C:
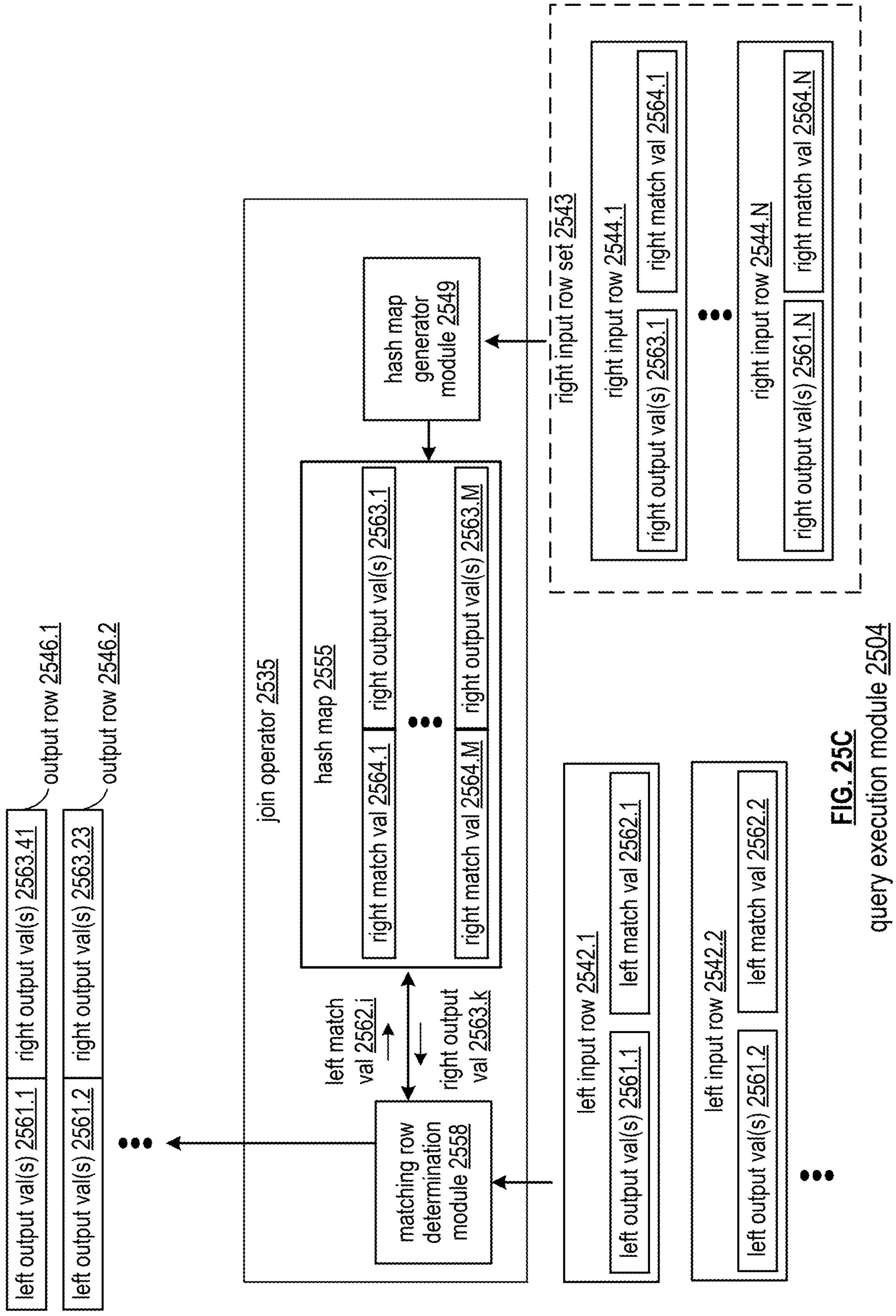
FIG. 25C is a schematic block diagram of a query execution module executing a join operator based on utilizing a hasp map generated from right input rows in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 of FIGS. 24A-24C when executing queries indicating join expressions. Some or all features and/or functionality of FIGS. 25A-25C can be utilized to implement any embodiment of the database system 10 described herein.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows be selected and/or generated for processing, such as which columns of which tables be selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output rows 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via a nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

FIG. 25B illustrates an embodiment of a query execution module 2504 executing a join process 2530 via a plurality of parallelized processes 2550.1-2550.L. Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. The plurality of parallelized processes 2550.1-2550.L can be implemented via any other set of parallelized and/or distinct memory and/or processing resources.

Each parallelized process 2550 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, L different nodes and/or L different subsets of nodes that each include multiple nodes generate a corresponding left input row subset 2547 at a corresponding level of the query execution plan at a level below the level of nodes implementing the plurality of parallelized processes 2550.1-2550.L. For example, each parallelized process 2550 only receives the left input rows 2542 generated by its own one or more child nodes, where each of these child nodes only sends its output data blocks to one parent. The left input row set 2541 can otherwise be segregated into the set of left input row subsets 2547.1-2547.L, each designated for a corresponding one of the set of parallelized processes 2550.1-2550.L. The plurality of left input row subsets 2547.1-2547.L can be mutually exclusive and collectively exhaustive with respect to the left input row set 2541, where each left input row 2542 is received and processed by exactly one parallelized process 2550.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547, L different nodes and/or L different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2550.1, for example, based on each node of this other set of nodes sending its output data blocks to all L nodes implementing the L parallelized processes 2550, rather than a single parent. Alternatively, the right input rows 2544 generated by a given node can be sent by the node to one parent implementing a corresponding one of the plurality of parallelized processes 2550.1-2550.L, where the L nodes perform a shuffle and/or broadcast process to share received rows of the right input row set 2543 with one another via a shuffle network 2480 to facilitate all L nodes receiving all of the right input rows 2544. Each right input row 2544 is otherwise received and processed by every parallelized process 2550.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows.

In some embodiments, to implement a right outer join, the right and left input rows of a right outer join are designated in reverse, enabling the right outer join to be correctly generated based on instead segregating the right input rows of the right outer join across all parallelized processes 2550, and instead processing all left input rows of the right outer join by all parallelized processes 2550.

The left input row set that is segregated across all parallelized processes 2550 vs. the right input row set processed via every parallelized processes 2550 can be selected, for example, based on an optimization process performed when generating the query operator execution flow 2517. For example, for a join specified as being performed upon two sets of input rows, while the input row set segregated amongst different parallelized processes 2550 and the input row set processed via every parallelized processes 2550 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the "left" input row set 2541 that is segregated across all parallelized processes 2550 is selected to instead correspond to the right hand side designated by the query expression, and the "right" input row set 2543 that is segregated across all parallelized processes 2550 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

FIG. 25C illustrates an embodiment of a query execution module 2504 executing a join operator 2535. The embodiment of implementing the join operator 2535 of FIG. 25C can be utilized to implement the join process 2530 of FIG. 25A and/or can be utilized to implement the join operator 2535 executed via each of a set of parallelized processes 2550 of FIG. 25B.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2536. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.*i*, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519. In the case where a match is identified as a right input row 2544.*k*, the right output value 2563 is retrieved and/or otherwise determined based on the hash map 2555, and the respective output row 2546 is generated to include the a new row generated to include both the one or more left output values 2561.*i* of the left input row 2542.*i*, as well as the right output values 2563.*k* of the identified matching right input row 2544.*k*.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values. An example of implementing this functionality is discussed in further detail in conjunction with FIGS. 26C-26D. Another example of handling this functionality for parallelized processes implementing their own join operators to ensure these unmatched rows are not duplicated and/or to ensure the unmatched rows are only padded with nulls in output when these rows don't match left input rows processed via other parallelized processes.

FIGS. 26A-26F illustrate embodiments of a database system 10 operable to execute queries indicating join expressions based on executing left join operators via forwarding of left input rows. Some or all features and/or functionality of FIGS. 26A-26F can be utilized to implement the join processes of FIGS. 25A-25C and/or can be utilized to implement database system 10 of FIGS. 24A-24C when executing queries indicating join expressions. Some or all features and/or functionality of FIGS. 26A-26F can be utilized to implement any embodiment of the database system 10 described herein.

In some embodiments, whenever a process operator can forward some of its input column streams to its parent without mutating them, performance can be improved because the operator doesn't have to write copies of every row it receives. The features and functionality presented in conjunction with FIGS. 26A-26F utilize this means of improving performance by forwarding left input rows of a given left join. This processing of join expressions via forwarding left input rows as presented in conjunction with FIGS. 26A-26F can improve the technology of database systems by improving efficiency of query executions that require performance of join expression.

In particular, the nature of left joins can be leveraged: for left joins, every single left input row a join operator receives will be output at least once, either padded with nulls for the right columns or with a matching right row. Thus, a join operator 2535 processing a left join can forwards the columns it receives from its left child, and then looks for a matching row in the hash map 2555 it built from right rows. If it finds a match, it can copy the matching right row to the output, and if it doesn't find a match, it can write null values for the right columns.

Because there are cases where a left row can have multiple matching right rows that need to be outputted multiple times, the join operator 2535 can use 2 output partitions, for example, by implementing two in-progress output data blocks at a time. The first data block can have its left columns forwarded and can utilize standard output column streams for the right columns. The second data block optionally does not use any column forwarding. For example, the second data block is only used when a left row matches with multiple right rows. In some embodiments, run-length encoding can be employed in data blocks to avoid needing the second output data block, meaning copies would never need to be made of the incoming left rows.

This mechanism of improving performance of left joins can be further employed to implement other types of joins. For example, full outer joins can be performed by first performing a left join while keeping track of which hash map entries match, and by then "finishing the right join" to implement the full outer join by outputting the unmatched right rows. For these full outer joins, input forwarding can be employed during the left join phase. Example embodiments of implementing a full outer join are discussed in conjunction with FIGS. 26C-26D.

As another example, inner joins can be performed by adapting this left join. Although there is no guarantee that every input row will be output by an inner join, in practice, many inner joins are 1 to 1 mappings and can benefit from input forwarding. For that reason, when processing an inner join, the join operator can attempt to forward incoming left rows in the same way as for a left join. However, as soon as the join operator detects a left row does not have a match, the input forwarding is abandoned, and the join operator can resort to writing copies for the output. Example embodiments of implementing an inner join are discussed in conjunction with FIGS. 26E-26F.

As another example, right joins can be performed by adapting this left join. In particular, this adapted inner join can be performed, and then the right join can be completed by finishing the right join. During the inner join phase of a right join, the attempt to forward inputs described in conjunction with FIGS. 26E-26F can be employed.

Figure 26A:
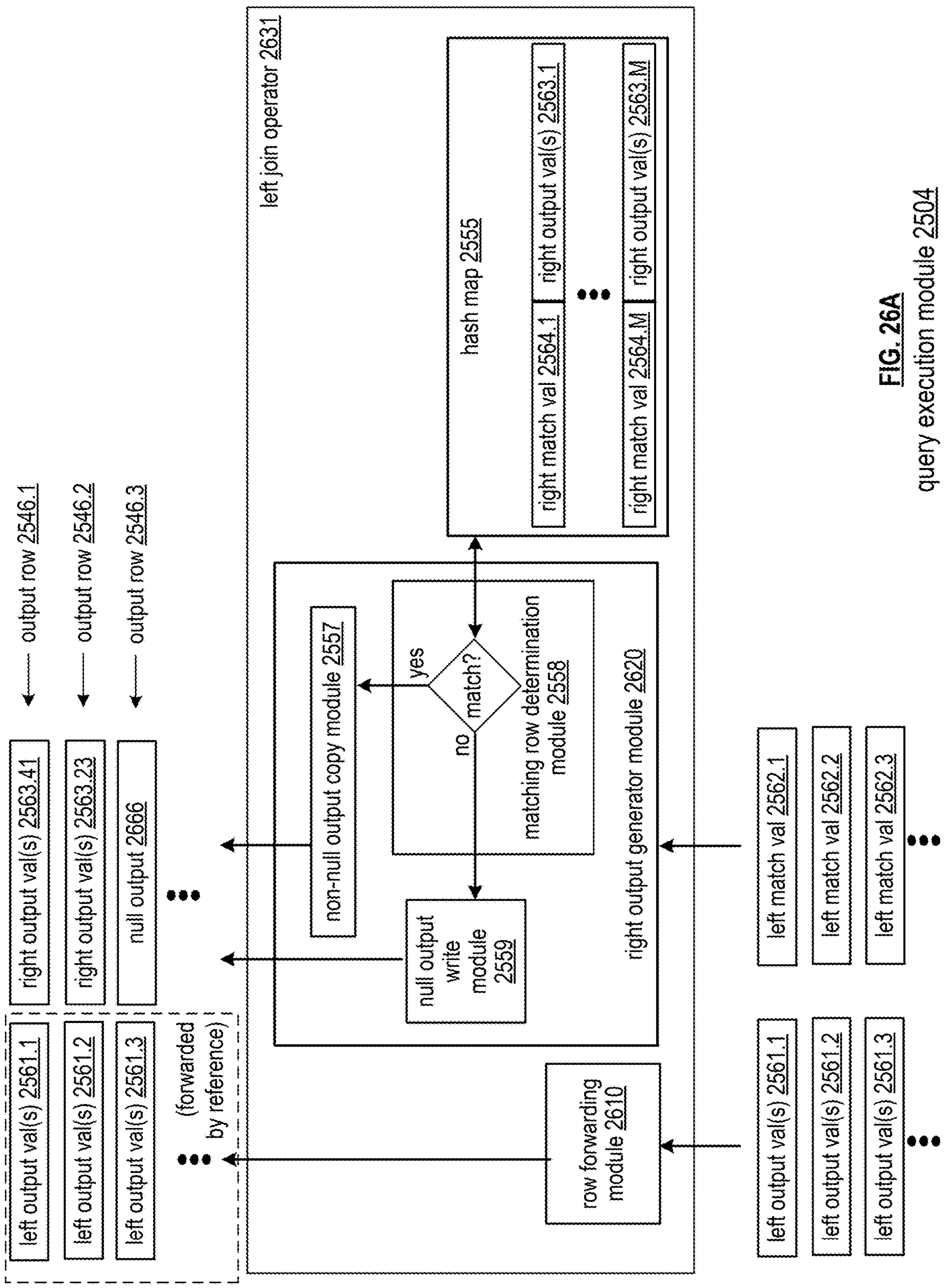
FIG. 26A is a schematic block diagram of a query execution module executing a left join operator based on forwarding left output values of left input rows in accordance with various embodiments.

FIG. 26A illustrates an embodiment of a query execution module that executes a left join operator 2631 that implements a row forwarding module 2610 to forward left output values 2561 of incoming rows in output rows 2546, based on all left output values being guaranteed to be included in output due to the join being implemented as a left outer join. The left join operator 2631 can be implemented via some or all features and/or functionality of join operator 2631, and can be specific to executing left outer joins. Some or all features and/or functionality of the implementation of the left join operator 2631 of FIG. 26A can be utilized to implement the join operator 2535 of FIG. 25C, and/or to implement any other embodiment of join operator 2535 and/or join process 2530 described herein.

The row forwarding module 2610 can forward left output values 2561 of incoming rows, for example, based on forwarding the values by reference rather than copying and emitting the respective left input values. The stream of left output values can simply be forwarded, for example, in conjunction with preserving same ordering as they are received, for example, in one or more corresponding output columns. For example, as each incoming left input row is received, its left output value is emitted by reference to the respective left input value. This can include emitting the left output values 2561 as memory references or other identifiers indicating the location of/otherwise identifying the respective left input values. As discussed previously, this simple forwarding can be ideal over storing, copying, and/or rewriting these values.

In cases where these left output values are not left match values 2562, these forward values require no processing and are simply forwarded by reference. In cases where these left output values are left match values 2562, these forward values are still forwarded by reference, and are also processed separately to identify matches.

In some cases, rather than the respective values having already been forwarded in data blocks to the join operator, the respective values are retrieved separately after the join, and the left output values are optionally forwarded as memory references and/or row identifiers indicating which row's respective output columns be included in the given output.

As left output values are forwarded, their respective right output for each left output values 2561 can be determined via a right output generator module 2620, where the left output values 2561 of each output row is combined with either matching right output values 2563 in the case where a match is identified in the hash map 2555, or is combined with null output, such as one or more null values for the corresponding one or more columns of the right output values designated for inclusion in the output rows 2546. In particular, the matching row determination module 2558 can be implemented to identify matches as discussed in conjunction with FIG. 25C, where a left row's given matching right row 2544, if applicable, has its one or more right output values 2563 copied as output in conjunction with the given left output values 2561 in a same or different column stream via a non-null output copy module 2557. When the matching row determination module 2558 determines no match is identified, null values 2666 are outputted in conjunction with the given left output values 2561 in this same or different column stream via a null output write module 2559. Thus, output rows 2546 are emitted based on the left output columns being seamlessly padded with null values or appended with the appropriate right output values, as applicable, as the respective left output values are directly forwarded via row forwarding module 2610.

In this example, right output value 2563.41 is copied from hash map 2555 and/or other storage location indicated by the respective key 2564.41 in from hash map 2555 via non-null output copy module 2557 for output in conjunction with forwarded one or more left output values 2561.1 for inclusion in a same output row 2546.1 as the forwarded one or more left output values 2561.1.

Similarly, in this example, right output value 2563.23 is copied from hash map 2555 and/or other storage location indicated by the respective key 2564.23 in from hash map 2555 via non-null copy module 2557 for output in conjunction with forwarded one or more left output values 2561.2 for inclusion in a same output row 2546.2 as the forwarded one or more left output values 2561.2.

Furthermore, in this example, a null output 2666 is written for output in conjunction with forwarded one or more left output values 2561.3, rather than writing of copied right output values, based on the left match value 2563.3 having no match in hash map 2555.

In some embodiments, some or all of this forwarding of left output values can be performed before some or all right input rows have been received, and/or before building of hash map 2555 is complete. For example, the corresponding right output values are emitted later in a separate one or more column streams in the correct ordering as the forwarded left rows, and/or otherwise denote the appropriate left rows to enable matching of the output with correct rows later. In other embodiments, the forwarding of left output values and processing of respective left match values is performed only after the building of hash map 2555 to enable appending of right output values and/or null output with these forwarded values.

In the case where a given left output column is also implemented as the column denoted by matching condition to check for matching with right input rows, the left output values 2561 can be forwarded via row forwarding module 2610, and can further be processed by the right output generator module 2620 to identify respective matches. The row forwarding of these rows can still be implemented without copying these rows, despite the processing by the right output generator module 2620, as all incoming left rows are outputted for the left join regardless of whether they have identified right row matches.

The row forwarding module 2610 can implement some or all features and/or functionality of the forwarding module 2950 of FIG. 24C, for example, where the corresponding left input values of incoming rows are forwarded by reference as the left output values 2561. While FIG. 26A depicts the output of row forwarding module 2610 as left output values 2561 for purposes of illustrating the corresponding mapping with match values or null values, these left output values 2561 are optionally emitted by reference rather than being copied and emitted directly as the corresponding values (e.g. rather than these left output values 2561 being written to the respective one or more output data blocks). For example, the column values of the left input values are stored in at least one data block of a corresponding column stream in at least one corresponding memory location 2951, and rather than copying these values into data blocks as output, the row forwarding module emits (e.g. writes to a corresponding one or more data blocks) memory references 2952 indicating this at least one corresponding memory location 2951 in a corresponding column stream. Similarly, in FIGS. 26B-26E, while left output values 2561 are depicted as output of row forwarding module 2610 for purposes of illustration, these left output values 2561 are optionally similarly emitted by reference (e.g. indicated via at least one memory reference to the location of the respective left input values), rather than being copied and emitted directly.

Figure 26B:
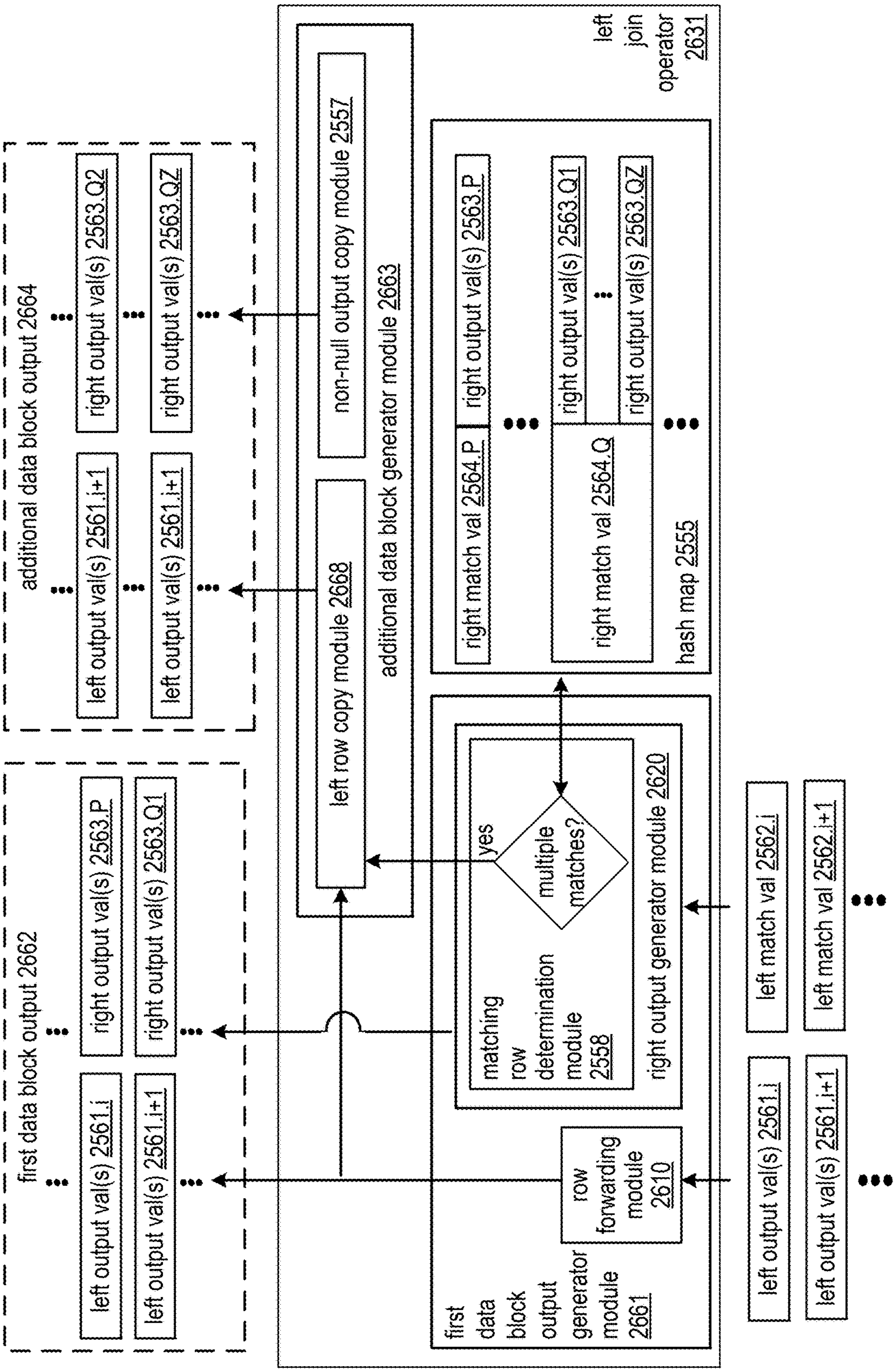
FIG. 26B is a schematic block diagram of a query execution module executing a left join operator based on generating additional data block output when a left input row has multiple matches in accordance with various embodiments.

FIG. 26B illustrates the case where a given left input row has multiple matching right rows. Some or all features and/or functionality of executing the left join operator 2631 can be utilized to implement the left join operator 2631 of FIG. 26B, and/or any other embodiment of the left join operator 2631, any other join operator 2535, and/or any join process 2530 described herein.

Execution of left join operator 2631 can include generating one or more data blocks in tandem for each incoming row. The first data block is always generated, via a first data block output generator module 2661, via the row forwarding module 2610 and right output generator module 2620 as discussed in conjunction with FIG. 26A, based on all left input rows being included in at least one output row for a left outer join as discussed previously. While not depicted, the right output generator module 2620 can implement the non-null output copy module 2557 and the null output write module 2559 of FIG. 26A. The data blocks that include the output rows 2546 with the forwarded left values and corresponding right output generated via the right output generator module 2620 of FIG. 26A can thus be included in first data block output 2662.

To handle the fact that some incoming left input rows must be included in multiple output rows 2546 due to matching multiple right input rows, an additional data block generator module 2663 can be implemented to generate one or more additional data blocks of additional data block output 2664, in addition to the first data blocks 2662 generated to include the forwarded left output values of incoming left rows. For example, two or more data blocks are built and emitted from a given incoming left input row 2542 in tandem, but are only necessary in the cases where the given incoming left input row has multiple matches. The matching row determination module 2558, when identifying whether matches exist, can further determine whether a matching key maps to right output values for multiple right input rows, where the additional data block generator module 2663 is implemented when matching row determination module 2558 determines the given left match value maps to right output values for multiple right input rows.

The additional data block generator module 2663 can implement a left row copy module 2668 and/or the non-null output copy module 2557. The left row copy module 2668 can copy the forwarded output into an additional data block for output. Thus, left output values 2561 are only copied when needed for inclusion in data blocks of an additional output row beyond the data blocks of a first output row due to the corresponding left input row having multiple matches. The non-null output copy module 2557 can copy the value of a respective right output value of the multiple matching right output rows not already copied in the first data block or other data blocks for given left output value, based on accessing the hash map 2555. The non-null output copy module 2557 of the additional data block generator module 2663 can be implemented in a same or similar fashion as the non-null output copy module 2557 of the right output generator module 2620 of the first data block output generator 2661 as discussed in conjunction with FIG. 26A.

In this example, left input rows 2542.*i* and 2542.*i*+1 of the incoming left input rows are processed. This example can continue from the example of FIG. 26A, where left input rows 2542.*i* and 2542.*i*+1 are processed after left input rows 2542.1-2542.3 of FIG. 26A, where the output rows 2546.1-2546.3 of FIG. 26A are all emitted as first data block output 2662 based on the left output values having been forwarded via row forwarding module 2610.

As indicated by hash map 2555 in this example, a right match value 2564.P, or the corresponding key, maps to the right match value 2564 for only one right input row 2544, and has the one or more right output values 2563.P for this respective row. Incoming left match value 2562.*i* is identified to match with this right match value 2564.P, and the first data block output generator module 2661 generates the first output data block as having forwarded left output values 2561.*i* appended with right output value 2563.P. As this is the only matching row for left input row 2542.*i*, the additional data blocks are not necessary, and additional data block generator module 2663 is not employed for left input row 2542.*i*.

Furthermore, as indicated by hash map 2555 in this example, a right match value 2564.Q, or the corresponding key, maps to the right match value 2564 for Z different right input rows 2544.Q1-2544.QZ, where the value of Z is greater than or equal to two. Incoming left match value 2562.*i*+1 is identified to match with this right match value 2564.Q, and the first data block output generator module 2661 generates the first output data block as having forwarded left output values 2561.*i* appended with right output value 2563.Q1 for only one of the respective matches.

In other embodiments, rather than all Z matches for left input row 2542.*i*+1 being mapped to a same key of hash map 2555, some or all of the Z matches for left input row 2542.*i*+1 can be mapped to different keys, where the multiple different keys are determined to match with the given match value 2562.*i*+1, for example, in the case where the matching condition 2519 is not equality based, but instead utilized another logical operator where multiple keys and/or multiple different corresponding right match values 2564 could be valid matches for a given left match value 2562 as defined by the matching condition 2519.

In either case, Z−1 additional data blocks beyond the first data block can thus be generated for the given left input row 2542.*i*+1 via the additional data block generator module to include Z−1 corresponding additional output rows 2546 based on multiple matches being identified for right match value 2564 to include. The left row copy module 2668 copies the given left output value 2561.*i*+1 for each of these Z−1 additional output rows via the row copy module 2668, and copies respective different ones of the remaining Z−1 right output values 2563.Q1-2563.QZ for each of these Z−1 additional output rows.

Figure 26C:
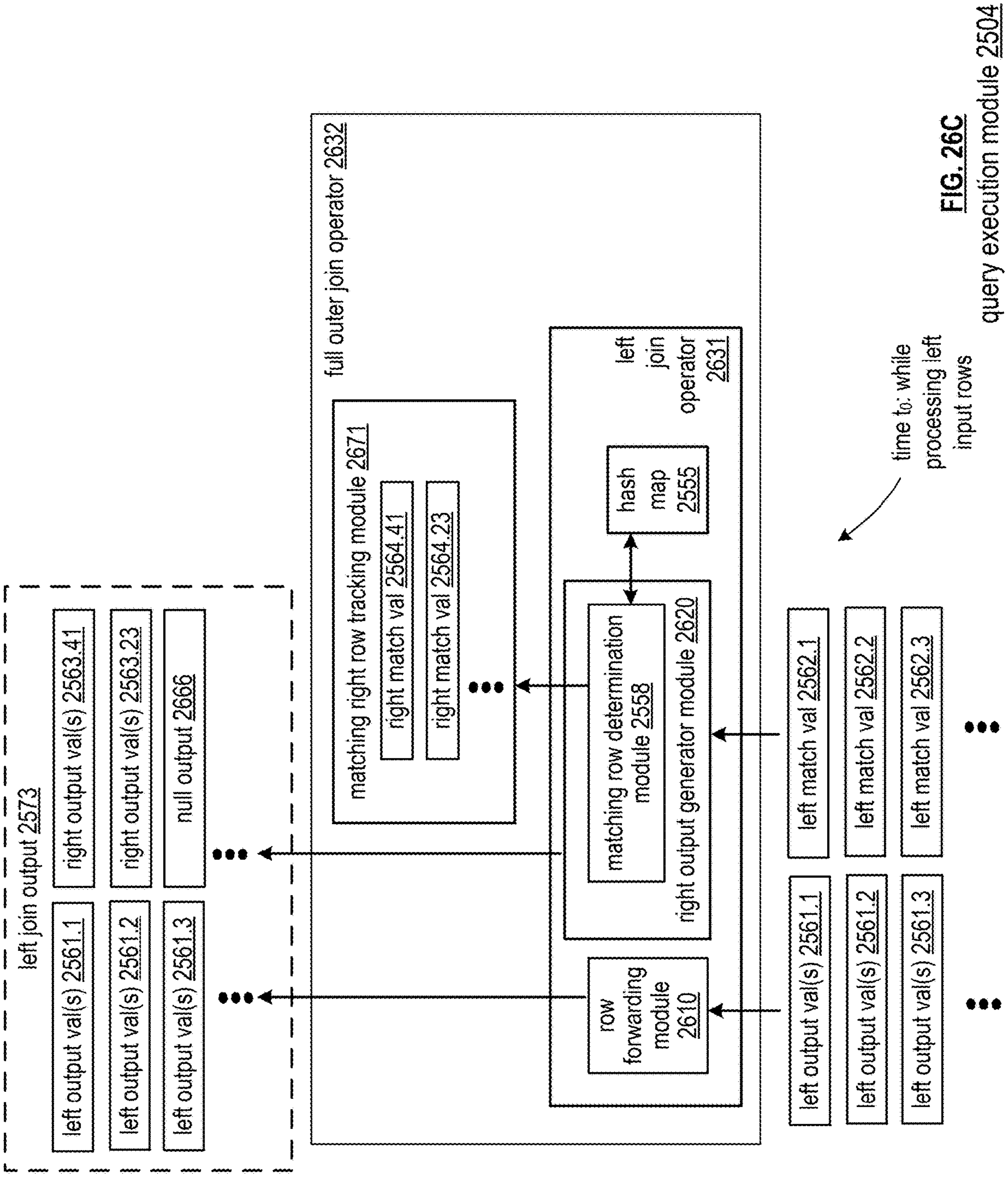
FIGS. 26C-26D are schematic block diagrams of a query execution module executing an outer join operator based on implementing a left join operator and tracking matching right rows to determine remaining right rows for output in accordance with various embodiments.
Figure 26D:
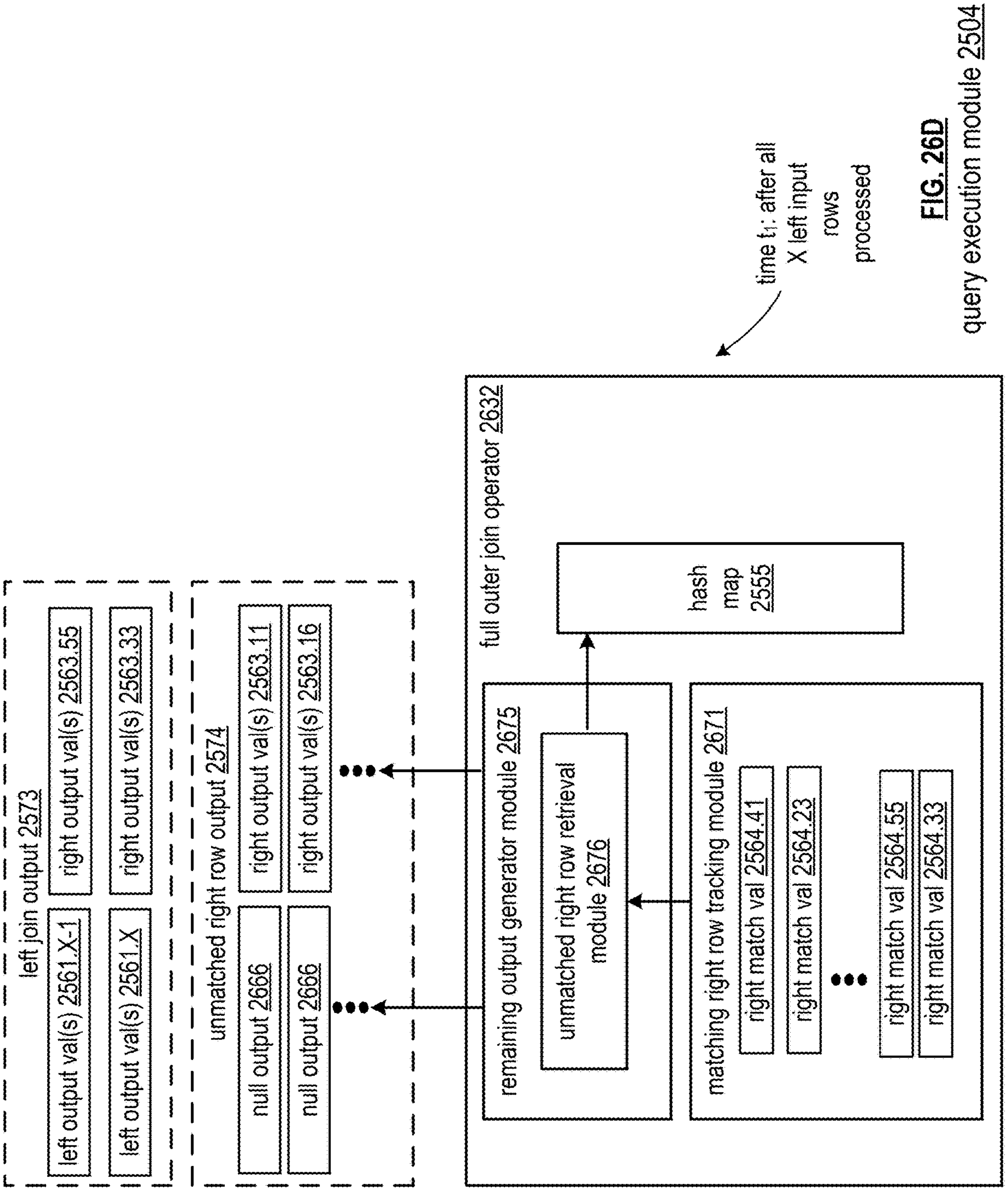

FIGS. 26C-26D illustrate embodiments of executing a full outer join operator 2632. Some or all features and/or functionality of executing the full outer join operator 2632 can be utilized to implement the join operator 2535 of FIG. 25C, and/or any other embodiment of the join operator 2535 and/or any join process 2530 described herein.

As illustrated in FIGS. 26C and 26D, the full outer join operator 2632 can be implemented by adapting a left join operator 2631, which can be implemented via some or all features and/or functionality of the left join operator 2631 of FIGS. 26A and/or 26B. For example, alternatively or in addition to implementing left join operators 2631 for executing respective join processes for join expressions denoting only a left join be performed, left join operators 2631 can be further implemented when executing respective join processes for join expressions denoting a full outer join be performed.

As illustrated in FIG. 26C, at time to, while processing incoming left input rows, left output values 2561 and corresponding right output values 2563 of left join output 2573 can be emitted as output data blocks that include corresponding output rows 2546. In particular, as output of a full outer join includes all output of a left outer join, a portion of the output row set 2545 of the respective join process can include the output rows 2546 of left join output 2573 generated by first executing left outer join operator 2631, for example, as discussed in conjunction with FIGS. 26A and/or 26B.

Furthermore, as illustrated in FIG. 26C, a matching right row tracking module 2671 can be implemented to track right input rows that have been matched. This can include storing respective information in memory for access later in the execution of the full left outer join operator. For example, the key values for these right input rows of the hash map 2555, such as the raw and/or processed right match values, are stored. Continuing with the example of FIG. 26A, where the respective left join operator is implemented as part of implementing a full outer join operator 2632, the right row tracking module 2671 stores the right match values 2564.41 and 2564.23 based on having matched with left input rows 2542.1 and 2542.2 and being reflected in output rows of left join output 2573. No right row is tracked for left input rows 2542.3 based on this left input row having no matching right row. Further right input rows that matched with left input rows are tracked over time as further left input rows are received and processed.

As illustrated in FIG. 26D, at time $t_1$ after $t_0$, after processing all X incoming left input rows is completed, the full outer join operator 2632 begins to emit output rows 2546 of unmatched right row output 2574, which includes the right output values of unmatched right rows padded with null output 2666.

For example, all of the left join output 2573 has already been generated and emitted accordingly, and the remainder of the output for the full outer join operator is generated and emitted at this time as further output data blocks of unmatched right row output 2574 emitted strictly after all of the left join output 2573. This additional output optionally does not begin until all processing of all X incoming left input rows is completed, and/or after receiving a notification or otherwise confirming all incoming left input rows for processing have been received and processed. The X incoming left input rows can include all rows of the full left input row set 2541, and/or only the X rows of a corresponding left input row subset 2547 designated for processing by the given join operator 2535.

The matching right row tracking module 2671 can indicate all right match values 2564 that matched with left rows and had their respective right output values 2563 emitted. A remaining output generator module 2675 can access this information stored by matching right row tracking module 2671 to identify the right match values 2564 of the hash map 2555 that were not included in the set of right rows tracked by matching right row tracking module 2671, and can emit the respective right output values 2563 in unmatched right row output 2574 padded with null output 2666 accordingly. In this example, right output values 2563.11 and 2563.16 are included in output rows 2546 of unmatched right row output 2574 based on not having matched with any left match values of any of the X left match values 2562, and thus not having their respective right output values included in any output rows 2546 of the left join output 2573. For example, the remaining output generator module 2675 implements an unmatched right row retrieval module 2676 to retrieve all right output values 2563 mapped to right match values 2664 not indicated in the set of matching right rows tracked by matching right row tracking module 2671.

The set of right input rows having right output values included in the unmatched right row output 2574 can be equivalent to a set difference between the full set of right input rows and the subset of right input rows with right match values tracked via matching right row tracking module 2671, where this set difference can be further equivalent to the set difference between the full set of right input rows and the subset of right input rows with right output values included in left join output 2573.

The unmatched right row output 2574 can be guaranteed include all such right output values with unmatched right match values exactly once, padded with nulls. As these right output values appear for the first time in the unmatched right row output 2574, the full set of output emitted by the full outer join operator set can be guaranteed include all such right output values with unmatched right match values exactly once, padded with nulls. The unmatched right row output 2574 can be further guaranteed to include no right output values previously included in the left join output 2573. As these right output values appear in the left join output 2573, the full set of output emitted by the full outer join operator set can be guaranteed include all right output values of all right input rows at least once. Note that some right output values matching with more than one left input row may appear in the output more than once, where all of these multiple appearances of given right output values can be guaranteed to be included in output rows of the left join output 2573.

Figure 26E:
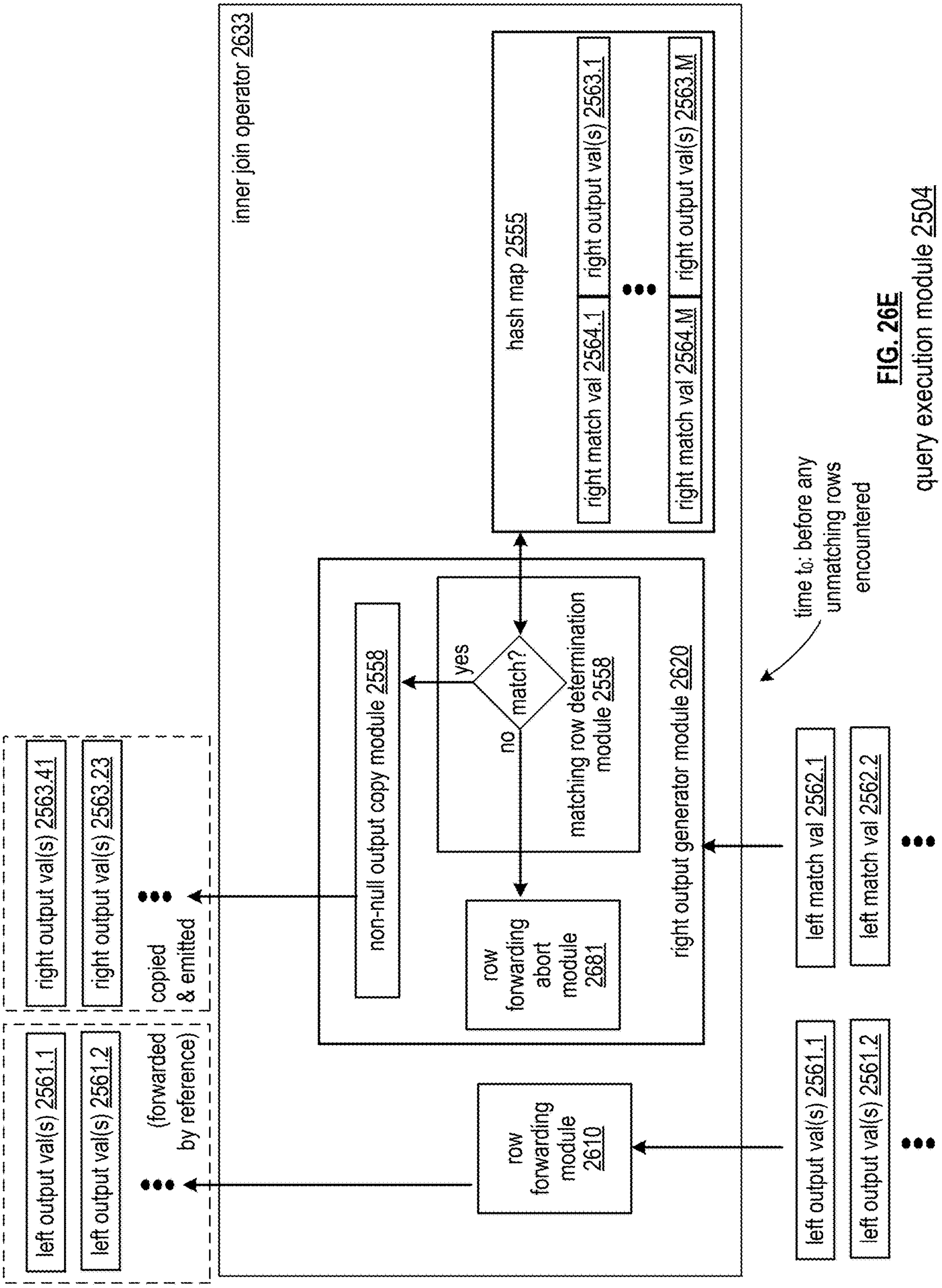
FIGS. 26E-26F are schematic block diagrams of a query execution module executing an inner join operator based on implementing left row forwarding until an unmatched left row is identified in accordance with various embodiments.
Figure 26F:
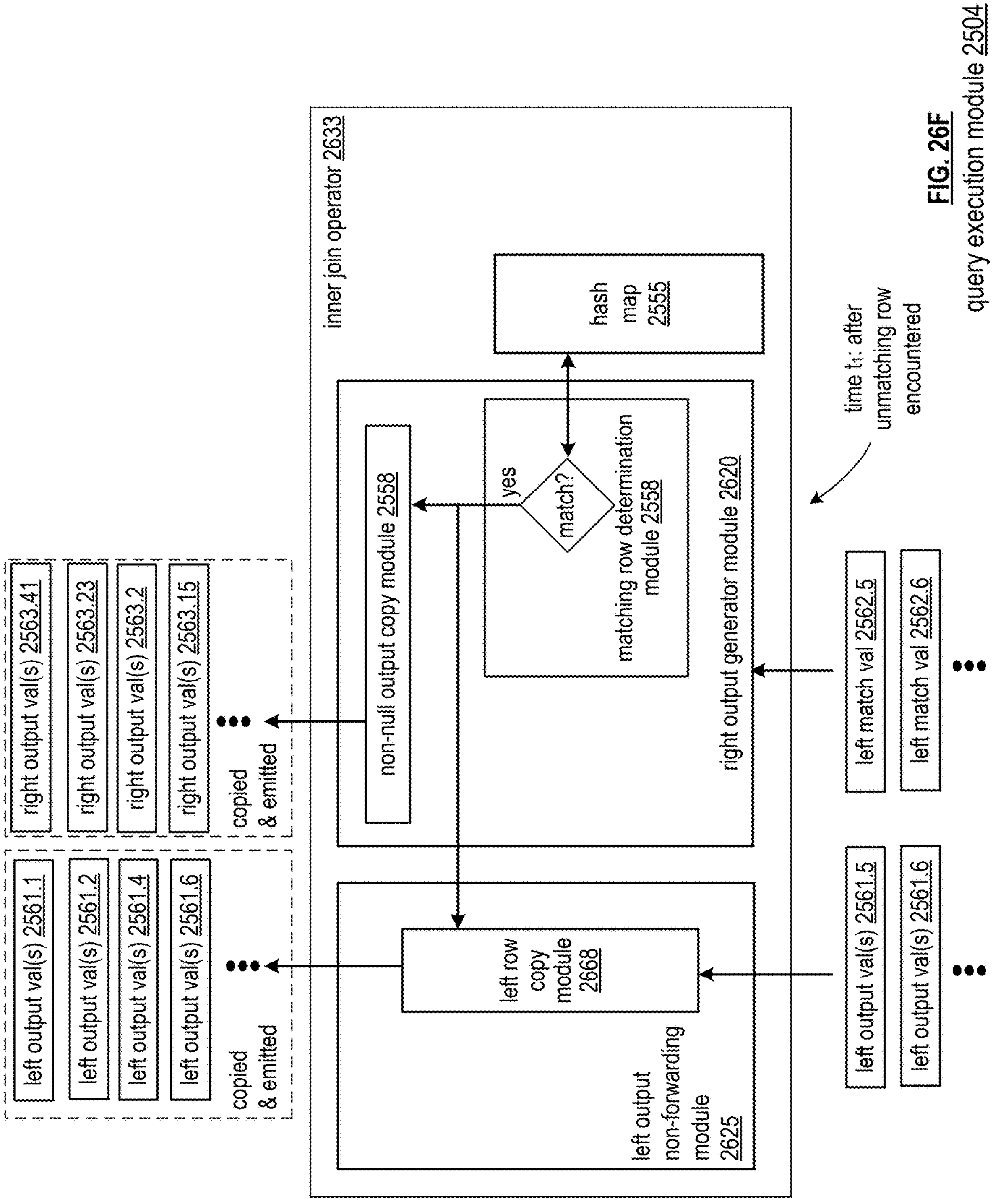

FIGS. 26E-26F illustrate embodiments of executing an inner join operator 2633. Some or all features and/or functionality of executing the inner join operator 2633 can be utilized to implement the join operator 2535 of FIG. 25C, and/or any other embodiment of the join operator 2535 and/or any join process 2530 described herein.

As illustrated in FIGS. 26E and 26F, the inner join operator 2633 can be implemented by adapting a left join operator 2631, which can be implemented via some or all features and/or functionality of the left join operator 2631 of FIGS. 26A and/or 26B. For example, alternatively or in addition to implementing left join operators 2631 for executing respective join processes for join expressions denoting only a left join be performed, left join operators 2631 can be further implemented when executing respective join processes for join expressions denoting an inner join be performed.

In particular, the inner join operator can be initially performed by implementing the left row forwarding of the left join operator 2631 discussed in conjunction with FIGS. 26A and 26B, with the hopes that a one-to-one mapping of left input rows to right input rows exists, and/or with the hopes that every left input row otherwise matches with at least one right input row, even if some right input rows are unmatched. For example, the output of the inner join expression is equivalent to the output of the outer left join expression in these cases, and this relationship can be leveraged to attempt processing of the inner join via the improved efficiency achieved via the row forwarding of left input rows discussed in conjunction with FIGS. 26A and 26B. If a left input row is encountered that does not have any match, the row forwarding is abandoned, and the remainder of the execution of the inner join operator is implemented by instead copying the incoming left output values for inclusion in output rows only when they have a matching right row.

As illustrated in FIG. 26E at time to, while processing incoming left input rows before any unmatched rows are encountered, left output values 2561 are forwarded via row forwarding module 2610, where the respective matching right output values are determined and copied, for example, as discussed in conjunction with FIGS. 26A and/or 26B. Continuing with the example of FIG. 26A, this row forwarding is implemented for generating the first two output rows 2546.1 and 2546.2 from left output values 2561.1 and 2561.2, respectively, appended with right output values 2564.41 and 2563.23, respectively.

The right output generator module 2620 can implement a row forwarding abort module 2681 that aborts this row forwarding by row forwarding module 2610 when an unmatched left row is encountered. Continuing with the example of FIG. 26A, left match value 2562.3 has no match value, and instead of being padded with null values, is not emitted due to the join operator being implemented as an inner join operator 2633. Furthermore, the row forwarding abort module 2681 is triggered to abort row forwarding once such an unmatching left row, such as left match value 2562.3 in this example, is encountered.

As illustrated in FIG. 26F, at time $t_1$ after $t_0$, after an unmatched row is encountered, such as left input row 2542.3 in this example, the inner join operator 2633 foregoes the forwarding of the left input rows, and instead implements a left output non-forwarding module 2625 for the remainder of processing. The left output non-forwarding module 2625 can implement left row copy module 2668, for example, in a same or similar fashion as the left row copy module 2668 of FIG. 26B, where the left output values are copied rather than being directly forwarded. For example, these values are locally stored, and are only emitted in output rows when a matching right row is identified via hash map 2555. In this example, the left output values 2561.4, and 2561.6, are copied and emitted with respective right output values 2563.2 and 2563.15, respectively. Meanwhile, left output values 2561.3 and 2561.5 of left input rows 2542.3 and 2542.5 are not emitted based on their respective left match values not having any matches with right match values in hash map 2555.

In other embodiments, the entirety of the inner join is performed via the forwarding module 2610, based on all left input rows matching with right input rows, where all output rows 2546 include non-null right output values matching with the given left input row identified via and/or copied from hash map 2555, and/or where all output rows 2546 include all left output values 2561 of all left input rows, where these left output values 2561 were forwarded via row forwarding module 2610 due to this forwarding never being aborted via the row forwarding abort module 2681.

Figure 26G:
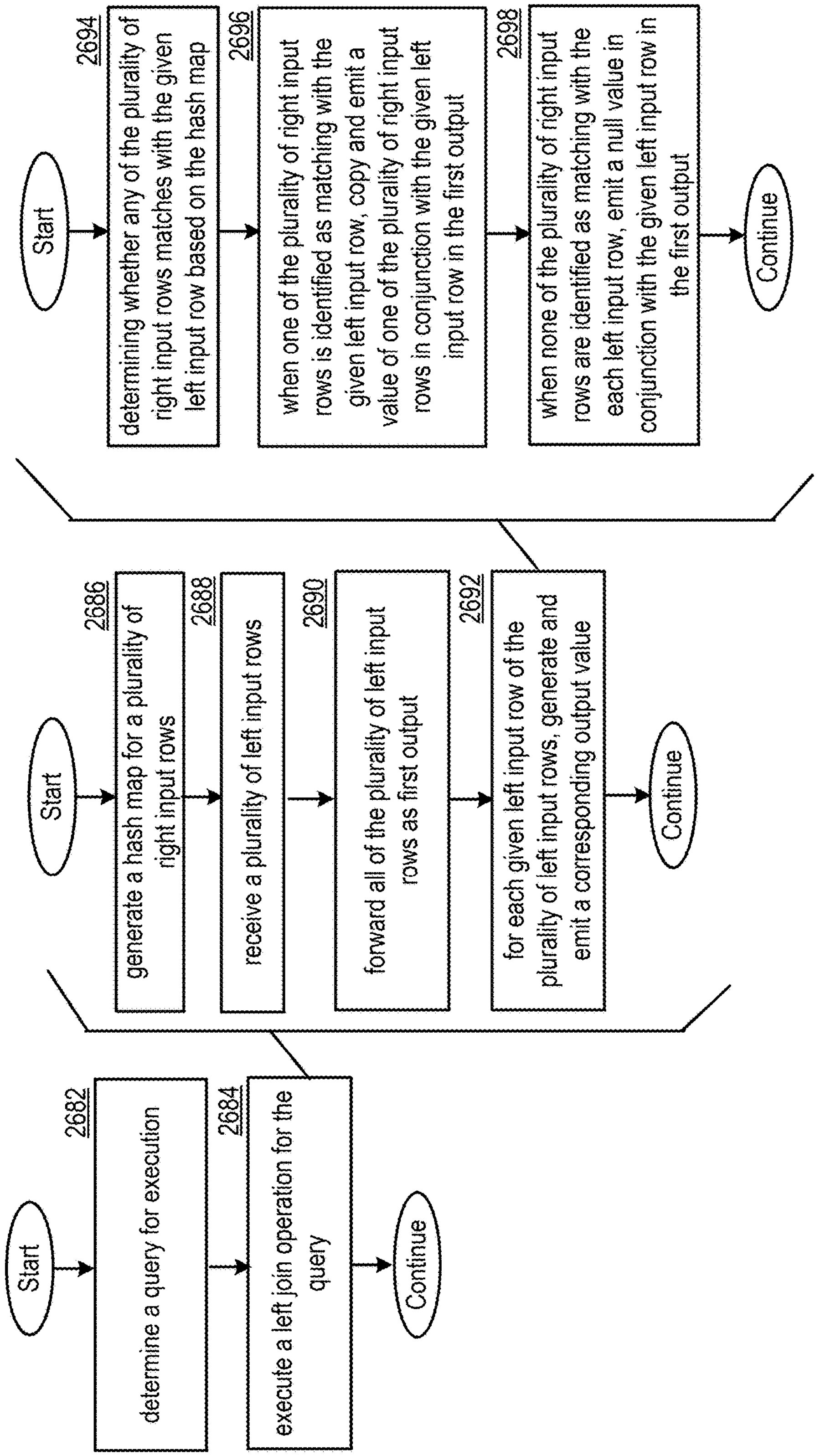
FIG. 26G is a logic diagram illustrating a method for execution in accordance with various embodiments.

FIG. 26G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26G. In particular, a node 37 can utilize the query processing module 2435 to execute some or all of the steps of FIG. 26G, where multiple nodes 37 implement their own query processing modules 2435 to independently execute the steps of FIG. 26G for example, to facilitate execution of a query as participants in a query execution plan 2405. Some or all of the method of FIG. 26G can be performed by the query processing system 2510, for example, by utilizing an operator flow generator module 2514 and/or a query execution module 2504. In particular, some or all of the method of FIG. 26G can be performed via one or more operator executions of one or more join operators 2535, such as a left join operator 2631, an outer join operator 2632, or an inner join operator 2633, of at least one join process 2530. Some or all of the steps of FIG. 26G can optionally be performed by any other processing module of the database system 10. Some or all of the steps of FIG. 26G can be performed to implement some or all of the functionality of the database system 10 as described in conjunction with FIGS. 26A-26F, for example, by implementing some or all of the functionality of the query processing system 2510 as described in conjunction with FIGS. 25A-25C. Some or all of the steps of FIG. 26G can be performed to implement some or all of the functionality regarding execution of a query via the plurality of nodes in the query execution plan 2405 as described in conjunction with some or all of FIGS. 24A-24C. Some or all steps of FIG. 26G can be performed by database system 10 in accordance with other embodiments of the database system 10 and/or nodes 37 discussed herein. Some or all steps of FIG. 26G can be performed in conjunction with one or more steps of any other method described herein.

Step 2682 includes determining a query for execution. Step 2684 includes executing a left join operation for the query.

Performing step 2684 can include performing one or more of steps 2686, 2688, 2690 and/or 2692. Step 2686 includes generating a hash map for a plurality of right input rows. Step 2688 includes receiving a plurality of left input rows. Step 2690 includes forwarding all of the plurality of left input rows as first output. Step 2692 includes, for each given left input row of the plurality of left input rows, generating and emitting a corresponding output value.

Performing step 2692 can include, for each given left input row of the plurality of left input rows, performing one or more of steps 2694, 2696, and/or 2898. Step 2694 includes determining whether any of the plurality of right input rows matches with the given left input row based on the hash map. Step 2696 includes, when one of the plurality of right input rows is identified as matching with the given left input row, copying and emitting a value of one of the plurality of right input rows in conjunction with the given left input row in the first output. Step 2698 includes, when none of the plurality of right input rows are identified as matching with the each left input row, emitting a null value in conjunction with the given left input row in the first output.

In various examples, the first output includes a plurality of data blocks each including one of the plurality of left input rows and one of: exactly one of the plurality of right input rows matching with the one of the plurality of left input rows, or a null value.

In various examples, a subset of the plurality of left input rows are determined to match with multiple ones of the plurality of right input rows. For each of the subset of the plurality of left input rows, the first output indicates the exactly one of the plurality of rows as one of the multiple ones of the plurality of right input rows matching with the each of the subset of the plurality of left input rows. The method can further include emitting second output that includes a second plurality of data blocks indicating, for the each of the subset of the plurality of left input rows, all additional ones of the plurality of right input rows matching with the each of the subset of the plurality of left input rows.

In various examples, each of the second plurality of data blocks further include a copy of the each of the subset of the plurality of left input rows.

In various examples, the method further includes maintaining two output data blocks at a time to processing the each left input row of the plurality of left input rows, where a first one of the two output data blocks is included in the first output, and/or where a second one of the two output data blocks is included in the second output.

In various examples, the second one of the two output data blocks is only utilized when a corresponding left input row of the plurality of left input rows matches with multiple right input rows.

In various examples, a plurality of data blocks utilizes a set of output column streams for a set of column values of a set of columns of the plurality of right input rows.

In various examples, the left join operation is performed based on a JOIN expression indicated by the query, where the join expression indicates a conditional statement relating the plurality of left input rows to the plurality of right input rows, and/or where the each left input row is determined to match with the one of the plurality of right input rows based on the conditional statement.

In various examples, the conditional statement indicates a given column of the plurality of right input rows and further indicates another given column of the plurality of left input rows. In various examples, the method further includes generating the hash map based on utilizing column values of the given column for each of the plurality of right input rows as keys of the hash map; and/or identifying the one of the plurality of right input rows as matching with the each left input row based on determining a value of the another given column of the each left input matches with a corresponding key of the hash map mapping to the one of the plurality of right input rows.

In various examples, the conditional statement indicates one of a set of relational operators that includes at least one of: an equality operator, an inequality operator, a less than operator, a greater than operator, a less than or equal to operator, or a greater than or equal to operator. In various examples, identifying the one of the plurality of right input rows as matching with the each left input row is based on determining the corresponding key and the value of the another given column of the each left input meet a condition defined by the relational operator.

In various examples, the left join operation for the query is executed as part of executing a full outer join. In various examples, the method further includes determining a subset of the plurality of right input rows of the hash map not matching with any of the plurality of left input rows based on tracking ones of the plurality of right input rows in the hash map matching ones of the plurality of left input rows. In various examples, the method further includes outputting the subset of the plurality of right input rows.

In various examples, the method further includes determining a second query for execution. In various examples, the method further includes executing an inner join operation for the second query by: generating a second hash map from a second plurality of right input rows; receiving a second plurality of left input rows; and/or initiating forwarding the all of the second plurality of left input rows as other first output. In various examples, when forwarding each left input row of the second plurality of left input rows, the method further includes, determining whether any of the second plurality of right input rows matches with the each left input row based on the hash map; when one of the second plurality of right input rows is identified as matching with the each left input row, copying a value of one of the second plurality of right input rows in conjunction with the each left input row in the other first output; and/or when none of the plurality of right input rows are identified as matching with the each left input row, foregoing forwarding of the second plurality of left input rows by, for remaining ones of the second plurality of left input rows, generating the other first output by writing copies of ones of the second plurality of left input rows identified to match with ones of the second plurality of right input rows in conjunction with copying of values of the ones of the second plurality of right input rows.

In various examples, all of the second plurality of left input rows are forwarded based on each of the second plurality of left input rows matching with at least one of the second plurality of right input row.

In various examples, the each of the second plurality of left input rows matches with at least one of the second plurality of right input rows based on corresponding sets of rows having a one to one mapping.

In various examples, the inner join operation is executed as a portion of executing a right join operation for the second query. In various examples, the method further includes determining a subset of the plurality of right input rows of the hash map not matching with any of the plurality of left input rows based on tracking ones of the plurality of right input rows in the hash map matching ones of the plurality of left input rows; and/or outputting the subset of the plurality of right input rows.

In various examples, the left join operation for the query is executed by a plurality of nodes in parallel. In various examples, the parallel execution of left join operation for the query is based on each of the plurality of nodes generating the hash map for all of the plurality of right input rows; based on each of the plurality of nodes receiving a corresponding proper subset of a plurality of proper subsets of the plurality of left input rows, where the plurality of proper subsets of the plurality of left input rows are mutually exclusive and collectively exhaustive with respect to the plurality of left input rows; based on each of the plurality of nodes forwarding all of the corresponding proper subset of the plurality of left input rows as a corresponding first output of a plurality of first output generated across the plurality of nodes; and/or based on each of the plurality of nodes, for each left input row of the corresponding proper subset of the plurality of left input rows: determining whether any of the plurality of right input rows matches with the each left input row based on the hash map; when one of the plurality of right input rows is identified as matching with the each left input row, copying a value of one of the plurality of right input rows in conjunction with the each left input row in the first output; and/or when none of the plurality of right input rows are identified as matching with the each left input row, forward a null value in conjunction with the each left input row in the first output.

In various examples, the plurality of nodes execute their portions of the query in a same level of a query execution plan for the query. In various examples, a parent node at a higher level of the query execution plan receives the plurality of first output generated across the plurality of nodes based on the plurality of nodes being child nodes of the parent node. In various examples, the parent node emits output based on applying a union to the plurality of first output.

In various examples, the method is executed by a node of a query execution plan collectively executing the query, and/or the plurality of left input rows are received from at least one child node of the node.

In various examples, the at least one child node read the plurality of left input rows from at least one segment stored in at least one memory drive accessible by the at least one child node.

In various examples, a hash map for a plurality of right input rows is generated based on a shuffle operation between the node and a plurality of other nodes in a same level as the node in a query execution plan. In various examples, each of the plurality of other nodes have a least one other child node that is distinct from the at least one child node of the node.

In various embodiments, any one of more of the various examples listed above are implemented in conjunction with performing some or all steps of FIG. 26G. In various embodiments, any set of the various examples listed above can be implemented in tandem, for example, in conjunction with performing some or all steps of FIG. 26G.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26G, for example, in conjunction with further implementing any one or more of the various examples described above.

In various embodiments, the operational instructions, when executed by the at least one processor, cause the database system to: determine a query for execution; and/or execute an inner join operation for the query. The database system can execute an inner join operation by: generating a hash map from a plurality of right input rows; receiving a plurality of left input rows; and/or forwarding all of the plurality of left input rows as first output. The database system can further execute the inner join operation by, for each left input row of the plurality of left input rows: determining whether any of the plurality of right input rows matches with the each left input row based on the hash map; when one of the plurality of right input rows is identified as matching with the each left input row, copying and emitting a value of one of the plurality of right input rows in conjunction with the each left input row in the first output; and/or when none of the plurality of right input rows are identified as matching with the each left input row, emitting a null value in conjunction with the each left input row in the first output.

In various embodiments, the operational instructions, when executed by the at least one processor, cause the database system to: determine a query operator execution flow for a query, the query operator execution flow indicating a serialized ordering of a plurality of operators, where a first operator is serially before a second operator in the query operator execution flow; initiate execution of the query based on initiating operator processing for at least one of the plurality of operators in accordance with the serialized ordering, where performance of second operator processing for the second operator is initiated after first operator processing for the first operator based on the second operator being serially after the first operator in the query operator execution flow; and/or finalize the execution of the query based on performing operator finalization for each of the plurality of operators in a second ordering different from the serialized ordering, where first operator finalization is performed for the first operator after second operator finalization is performed for the second operator.

As used herein, an "AND operator" can correspond to any operator implementing logical conjunction. As used herein, an "OR operator" can correspond to any operator implementing logical disjunction.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form of a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A query and response sub-system of a database system, wherein the query and response sub-system comprises:
- plurality of computing device clusters, wherein a computing device cluster of the plurality of computing device clusters includes a plurality of computing devices, wherein a computing device of the plurality of computing devices includes a plurality of computing nodes, wherein a set of computing nodes of the pluralities of computing nodes of the pluralities of computing device clusters is operable to:
  - obtain a query that includes a join function regarding joining of data from two or more tables;
  - when the join function is a left inner join function:
    - identify a left table of the two or more tables;
    - determine a number of right tables of the two or more tables; and
    - when the number of right tables is one, create an execution plan for the join function that includes:
      - identify left data of a column of the left table based on a reference column that is common to both the left and right tables;
      - forward the rows of left data to memory allocated for a result table;
      - identify right data of a column of the right table based on the reference column;
      - temporarily store rows of the right data in memory allocated for the right table;
      - identify rows of matching data from the rows of right data based on matching data of the reference column;
      - add the rows of matching data to the memory allocated for the result table;
      - identify rows of non-matching data from the rows of right data based on data of the reference column; and
      - add NULL to the rows of non-matching data to the memory allocated for the result table.

2. The query and response sub-system of claim 1 further comprises:
- when the join function is a left outer join function:
  - identify the left table;
  - identify the right table; and
  - create an execution plan for the join function that includes:
    - forward the rows of columns of left data of the left table to memory allocated for a result table.

3. The query and response sub-system of claim 1 further comprises:
- when the number of right tables is two, create the execution plan for the join function that includes a first in-progress path for a first right table and a second in-progress path for a second right table, the first in-progress path includes:
  - forward the rows of left data to memory allocated for a result table;
  - identify first right data of a column of the first right table based on the reference column;
  - temporarily store rows of the first right data in memory allocated for the first right table;
  - identify rows of first matching data from the rows of first right data based on matching data of the reference column;
  - add the rows of first matching data to the memory allocated for the result table;
  - identify rows of first non-matching data from the rows of first right data based on data of the reference column; and
  - add NULL to the rows of first non-matching data to the memory allocated for the result table; and
- wherein the second in-progress path includes:
  - identify second right data of a column of the second right table based on the reference column;
  - temporarily store rows of the second right data in memory allocated for the second right table;
  - identify rows of second matching data from the rows of second right data based on matching data of the reference column;

add the rows of second matching data to the memory allocated for the result table;

identify rows of second non-matching data from the rows of second right data based on data of the reference column; and add NULL to the rows of second non-matching data to the memory allocated for the result table.

4. The query and response sub-system of claim 1 further comprises:

when the join function is a right inner join function:

identify a right table of the two or more tables;

determine a number of left tables of the two or more tables; and when the number of left tables is one, create an execution plan for the join function that includes:

identify right data of a column of the right table based on a reference column that is common to both the left and right tables;

forward the rows of right data to memory allocated for a result table;

identify left data of a column of the left table based on the reference column;

temporarily store rows of the left data in memory allocated for the left table;

identify rows of matching data from the rows of left data based on matching data of the reference column;

add the rows of matching data to the memory allocated for the result table;

identify rows of non-matching data from the rows of left data based on data of the reference column; and add NULL to the rows of non-matching data to the memory allocated for the result table.

5. The query and response sub-system of claim 4 further comprises:

when the join function is a right outer join function:

identify the left table;

identify the right table; and create an execution plan for the join function that includes:

forward the rows of columns of right data of the right table to memory allocated for a result table.

6. The query and response sub-system of claim 1 further comprises:

a set of computing nodes includes one or more computing nodes.

7. The query and response sub-system of claim 1, wherein the set of computing nodes is further operable to:

send the execution plan to pluralities of processing core resources of a computing nodes of computing devices of computing device clusters of a store and compute sub-system of the database system, wherein the pluralities of processing core resources perform the execution plan substantially in parallel.

8. A computer readable memory comprises:

first memory that stores operational instructions that, when executed by a set of computing nodes, causes the set of computing nodes to:

obtain a query that includes a join function regarding joining of data from two or more tables; and second memory that stores operational instructions that, when executed by the set of computing nodes, causes the set of computing nodes to:

when the join function is a left inner join function:

identify a left table of the two or more tables;

determine a number of right tables of the two or more tables; and when the number of right tables is one, create an execution plan for the join function that includes:

identify left data of a column of the left table based on a reference column that is common to both the left and right tables;

forward the rows of left data to memory allocated for a result table;

identify right data of a column of the right table based on the reference column;

temporarily store rows of the right data in memory allocated for the right table;

identify rows of matching data from the rows of right data based on matching data of the reference column;

add the rows of matching data to the memory allocated for the result table;

identify rows of non-matching data from the rows of right data based on data of the reference column; and add NULL to the rows of non-matching data to the memory allocated for the result table, wherein the set of computing nodes is of pluralities of computing nodes of plurality of computing devices of pluralities of computing device clusters of a query and response sub-system of a database system.

9. The computer readable memory of claim 8, wherein the second memory further stores operational instructions that, when executed by the set of computing nodes, causes the set of computing nodes to:

when the join function is a left outer join function:

identify the left table;

identify the right table; and create an execution plan for the join function that includes:

forward the rows of columns of left data of the left table to memory allocated for a result table.

10. The computer readable memory of claim 8, wherein the second memory further stores operational instructions that, when executed by the set of computing nodes, causes the set of computing nodes to:

when the number of right tables is two, create the execution plan for the join function that includes a first in-progress path for a first right table and a second in-progress path for a second right table, the first in-progress path includes:

forward the rows of left data to memory allocated for a result table;

identify first right data of a column of the first right table based on the reference column;

temporarily store rows of the first right data in memory allocated for the first right table;

identify rows of first matching data from the rows of first right data based on matching data of the reference column;

add the rows of first matching data to the memory allocated for the result table;

identify rows of first non-matching data from the rows of first right data based on data of the reference column; and add NULL to the rows of first non-matching data to the memory allocated for the result table; and wherein the second in-progress path includes:

identify second right data of a column of the second right table based on the reference column;

temporarily store rows of the second right data in memory allocated for the second right table;

identify rows of second matching data from the rows of second right data based on matching data of the reference column;

add the rows of second matching data to the memory allocated for the result table;

identify rows of second non-matching data from the rows of second right data based on data of the reference column; and add NULL to the rows of second non-matching data to the memory allocated for the result table.

11. The computer readable memory of claim 8, wherein the second memory further stores operational instructions that, when executed by the set of computing nodes, causes the set of computing nodes to:

when the join function is a right inner join function:

identify a right table of the two or more tables;

determine a number of left tables of the two or more tables; and when the number of left tables is one, create an execution plan for the join function that includes:

identify right data of a column of the right table based on a reference column that is common to both the left and right tables;

forward the rows of right data to memory allocated for a result table;

identify left data of a column of the left table based on the reference column;

temporarily store rows of the left data in memory allocated for the left table;

identify rows of matching data from the rows of left data based on matching data of the reference column;

add the rows of matching data to the memory allocated for the result table;

identify rows of non-matching data from the rows of left data based on data of the reference column; and add NULL to the rows of non-matching data to the memory allocated for the result table.

12. The computer readable memory of claim 11, wherein the second memory further stores operational instructions that, when executed by the set of computing nodes, causes the set of computing nodes to:

when the join function is a right outer join function:

identify the left table;

identify the right table; and create an execution plan for the join function that includes:

forward the rows of columns of right data of the right table to memory allocated for a result table.

13. The computer readable memory of claim 11, wherein the second memory further stores operational instructions that, when executed by the set of computing nodes, causes the set of computing nodes to:

send the execution plan to pluralities of processing core resources of a computing nodes of computing devices of computing device clusters of a store and compute sub-system of the database system, wherein the pluralities of processing core resources perform the execution plan substantially in parallel.

* * * * *